(12) United States Patent
Hamminga et al.

(10) Patent No.: US 11,881,626 B2
(45) Date of Patent: Jan. 23, 2024

(54) RADAR SYSTEM COMPRISING TWO BACK-TO-BACK POSITIONED RADAR ANTENNA MODULES, AND A RADAR SYSTEM HOLDING AN ANTENNA MODULE WITH CAVITY SLOTTED-WAVEGUIDE ANTENNA ARRAYS FOR RADIATING AND RECEIVING RADAR WAVE SIGNALS

(71) Applicant: ROBIN RADAR FACILITIES BV, The Hague (NL)

(72) Inventors: Siete Hamminga, Heemstede (NL); Rob Van Der Meer, Pijnacker (NL)

(73) Assignee: ROBIN RADAR FACILITIES BV, The Hague (NL)

( * ) Notice: Subject to any disclaimer, the term of this patent is extended or adjusted under 35 U.S.C. 154(b) by 595 days.

(21) Appl. No.: 17/051,962

(22) PCT Filed: Apr. 25, 2019

(86) PCT No.: PCT/EP2019/060604
§ 371 (c)(1),
(2) Date: Oct. 30, 2020

(87) PCT Pub. No.: WO2019/211158
PCT Pub. Date: Nov. 7, 2019

(65) Prior Publication Data
US 2021/0135370 A1    May 6, 2021

(30) Foreign Application Priority Data

May 1, 2018  (DK) .............................. PA201870259
Feb. 4, 2019 (DK) .............................. PA201970080
Feb. 4, 2019 (DK) .............................. PA201970081

(51) Int. Cl.
*H01Q 3/04* (2006.01)
*H01Q 21/00* (2006.01)
(Continued)

(52) U.S. Cl.
CPC ............. *H01Q 21/005* (2013.01); *G01S 7/02* (2013.01); *G01S 13/426* (2013.01); *G01S 13/88* (2013.01);
(Continued)

(58) Field of Classification Search
CPC ........ G01S 13/34; G01S 13/426; G01S 13/88; G01S 7/02; G01S 7/027; H01Q 1/52;
(Continued)

(56) References Cited

U.S. PATENT DOCUMENTS 3,906,502 A * 9/1975 Connolly ............. H01Q 21/005
342/372
4,675,681 A 6/1987 Kinsey
(Continued)

OTHER PUBLICATIONS

International Search Report, Application No. PCT/EP2019/060604, dated Sep. 27, 2019, 5 pages.
(Continued)

*Primary Examiner* — Tho G Phan
(74) *Attorney, Agent, or Firm* — Nordic Patent Service

(57) ABSTRACT

A radar system with antenna modules that have first and second planar slotted waveguide antenna arrays for radiating and receiving electromagnetic waves. A rotation system supports and rotates the antenna modules around a vertical axis. The modules are arranged back-to-back on opposite sides of a plane intersecting the vertical axis of rotation. Another radar system includes planar slotted waveguide antenna arrays with longitudinal extending waveguide columns. The front side of the columns holding the cavity slots of the first planar antenna array are positioned in a first plane and the front side of the columns holding the cavity slots of the second planar antenna array are positioned in a second plane parallel to the first plane. The arrays may be positioned at a distance to each other in a direction to the first and
(Continued)

second planes. The parallel planes may be offset with a minimum perpendicular array distance.

15 Claims, 20 Drawing Sheets

(51) Int. Cl.
    *G01S 7/02*         (2006.01)
    *G01S 13/42*       (2006.01)
    *G01S 13/88*       (2006.01)
    *H01Q 1/52*        (2006.01)
    *H01Q 25/00*      (2006.01)
    *G01S 13/34*       (2006.01)

(52) U.S. Cl.
    CPC .............. *H01Q 1/525* (2013.01); *H01Q 3/04* (2013.01); *H01Q 25/005* (2013.01); *G01S 7/027* (2021.05); *G01S 13/34* (2013.01)

(58) Field of Classification Search
    CPC ........ H01Q 1/525; H01Q 13/00; H01Q 13/10; H01Q 13/22; H01Q 21/00; H01Q 21/005; H01Q 21/06; H01Q 25/00; H01Q 25/005; H01Q 3/04
    See application file for complete search history.

(56) References Cited

U.S. PATENT DOCUMENTS

| | | | |
|---|---|---|---|
| 6,028,562 A * | 2/2000 | Guler | H01Q 21/005 |
| | | | 343/770 |
| 9,263,801 B2 | 2/2016 | Lenormand et al. | |
| 9,806,431 B1 * | 10/2017 | Izadian | H01Q 21/005 |
| 9,859,623 B2 * | 1/2018 | Bosshard | H01Q 21/064 |
| 11,515,624 B2 * | 11/2022 | Kona | H01Q 1/3233 |
| 11,575,216 B2 * | 2/2023 | Aurinsalo | H01Q 3/46 |
| 11,588,252 B2 * | 2/2023 | Hamminga | H01Q 21/064 |
| 2012/0115548 A1 | 5/2012 | Shimizu et al. | |
| 2016/0054439 A1 | 2/2016 | Brookner et al. | |
| 2018/0006367 A1 | 1/2018 | Clark et al. | |

OTHER PUBLICATIONS

Notification of Transmittal of the International Preliminary Report on Patentability, Application No. PCT/EP2019/060604, dated Jan. 16, 2020, 7 pages.

Provisional Opinion Accompanying the Partial Search Result, Application No. PCT/EP2019/060604, 9 pages.

\* cited by examiner

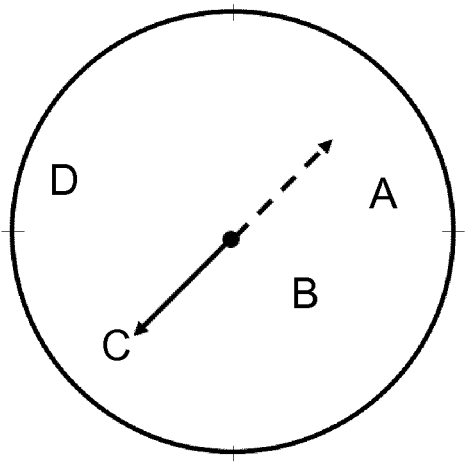
Fig. 15f   T=5
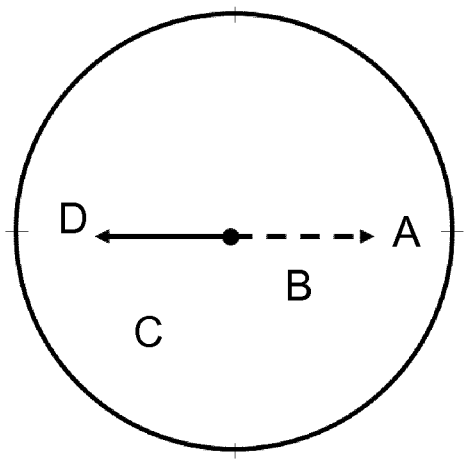
Fig. 15g   T=6
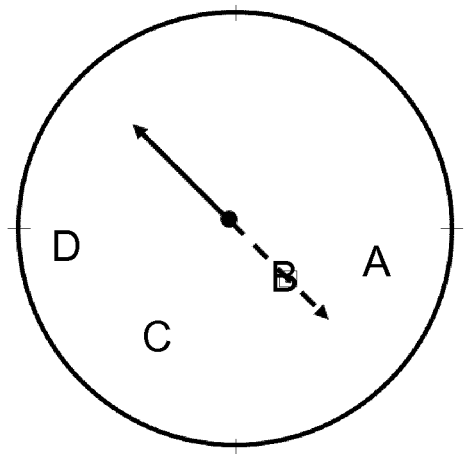
Fig. 15h   T=7
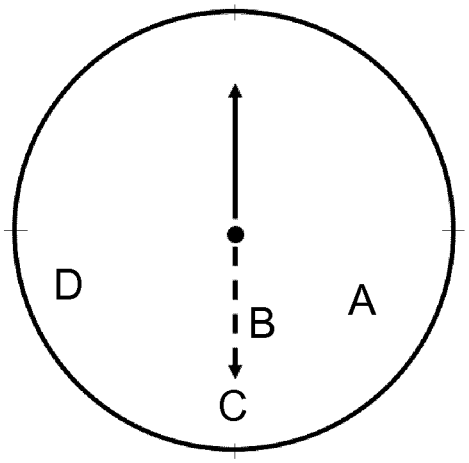
Fig. 15i   T=8

Overview of scanning moving objects with two antennas

| Time | Object | Azimuth | Range | Detected by antenna |
|---|---|---|---|---|
| 0 | | | | |
| 1 | A | 45 | Ya | 110a |
| 2 | C | 270 | Yc | 110b |
| 3 | B | 135 | Yb | 110a |
|   | D | 305 | Yd | 110b |
| 4 | | | | |
| 5 | C | 225 | Yc+$\delta$ | 110a |
| 6 | A | 90 | Ya+$\delta$ | 110b |
|   | D | 270 | Yd+$\delta$ | 110a |
| 7 | B | 135 | Yb+$\delta$ | 110b |
| 8 | C | 180 | Yc+$\delta 2$ | 110b |

Table I

Fig. 16

4.5 degrees

RADAR SYSTEM COMPRISING TWO BACK-TO-BACK POSITIONED RADAR ANTENNA MODULES, AND A RADAR SYSTEM HOLDING AN ANTENNA MODULE WITH CAVITY SLOTTED-WAVEGUIDE ANTENNA ARRAYS FOR RADIATING AND RECEIVING RADAR WAVE SIGNALS

TECHNICAL FIELD

The disclosure relates to a radar system comprising two back-to-back positioned radar antenna modules. The disclosure also relates to a radar system holding cavity slotted-waveguide antenna arrays for radiating and receiving radar wave signals. The disclosure also relates to antenna modules with radiating and receiving antenna arrays positioned with a distance to each other.

BACKGROUND

In the prior art, slotted-waveguide antennas, SWA, are well-known, where the waveguides may be arranged in an array of waveguides, such as a planar array of parallel waveguides. As the name suggests, slotted-waveguide antennas consist of lengths of waveguides with a multiple number of slots formed in the conducting walls of the waveguides. These slots introduce discontinuities in the conductor and interrupt the flow of current along the waveguide. Instead, the current must flow around the edges of the slots, causing them to act as dipole antennas.

The two basic types of SWAs are standing wave and traveling wave antennas. In a traveling wave SWA, the waveguide is built with matched loads or absorbers at the end, while in a standing wave SWA, the end of the waveguide is short-circuited.

Depending on the desired electric field polarization, the slots can be placed on either the narrow or broad wall of the waveguide. At the fundamental TE10 mode, longitudinal slots on the broad wall will produce a field with vertical polarization, while transverse slots on the narrow wall result in a horizontal field polarization.

For antenna systems used to detect small targets, such as birds or Unmanned Aerial Vehicles, UAV's, in a clutter rich environment, a horizontal polarization is preferred, which can be obtained by using an array of waveguides with transverse slots on the narrow wall.

Multi-beam radar systems with Frequency Modulated Continuous Wave, FMCW, waveforms is known in the art, and by using an antenna holding cavity slotted-waveguide arrays for transmitting and receiving electromagnetic waves, it is possible to obtain a multi-beam FMCW antenna system, which is very compact in size, and which is suitable for detecting small targets, such as birds or UAV's.

When detecting small objects or targets, it is required to have a high signal to noise ratio.

Noise may be introduced by having false reflections from the radiating antenna reaching the receiving antenna.

It would be advantageous to have an improved cavity slotted-waveguide antenna system, which reduces false reflections from the radiating antenna to the receiving antenna, thereby increasing the possibility of a correct classification of detected objects or targets.

A higher signal to noise ratio may also be obtained by having an increased radar signal exposure time on the object or target.

It would therefore be advantageous to have an improved cavity slotted-waveguide antenna system, which allows a high radar signal exposure time on an object or target, and which thereby increases the possibility of a correct classification of detected objects or targets.

SUMMARY

The aspects of the disclosed embodiments are directed to provide a cavity slotted-waveguide antenna array system, which allows a high radar signal exposure time on an object or target.

According to a first aspect there is provided a radar system comprising a first and a second antenna module, each said antenna module comprising:
 a first planar slotted waveguide antenna array configured for radiating electromagnetic waves; and
  a second planar slotted waveguide antenna array configured for receiving electromagnetic waves;
 wherein for each of the antenna modules, each planar slotted waveguide antenna array comprises several longitudinal extending waveguide columns disposed in a parallel and adjacent position with respect to one another, said waveguide columns having a front side and a rear side with a plurality of cavity slots on the front side, and said waveguide columns further having first and second column ends; and
  wherein for each of the antenna modules, the first and second antenna arrays are arranged with the longitudinal direction of the waveguide columns extending in a single, horizontal direction, and with the waveguide columns of the first antenna array disposed below and in a parallel position to the waveguide columns of the second antenna array;
 said radar system further comprising a rotation system configured for supporting and rotating the first and second antenna modules around a vertical axis, with the first and second antenna modules arranged in a back-to-back position on opposite sides of a plane intersecting the vertical axis of rotation, and with the rear side of the waveguide columns of the antenna arrays of the first antenna module facing the rear side of the waveguide columns of the antenna arrays of the second antenna module.

Thus, the front side of the waveguide columns of the antenna arrays of the first antenna module faces away from the front side of the waveguide columns of the antenna arrays of the second antenna module. This allows the first and second antenna modules to transmit electromagnetic waves in different directions. By having a rotating radar system with two back-to-back positioned antenna modules, it is possible to decrease the speed of rotation to half the speed of a rotating radar system, which comprises only a single radar module, while still having the same speed of update of radar tracks obtained from received signals being reflected from detected objects or targets. By lowering the speed of rotation, a higher signal exposure time on target is obtained, resulting in a higher signal to noise ratio, which again results in more information of any detected target or object.

In a possible implementation form of the first aspect, the system further comprises a protective housing in the form of a radome covering said first and second antenna modules.

In a possible implementation form of the first aspect, the radome is arranged in a fixed position without following the rotation of the rotation system and the antenna modules. It is also within an alternative embodiment that the radome is connected to the rotational system for being rotated by the rotation of the rotational system.

In a possible implementation form of the first aspect, the waveguide columns within the first and second antenna arrays of both the first and second antenna modules have equal dimensions or equal mechanical dimensions. By having equal dimensioned waveguide columns for both antenna modules, it is possible to operate within the same frequency band for both antenna modules.

In a possible implementation form of the first aspect, then for one or both of the antenna modules, the front side of the columns holding the cavity slots of both the first and second antenna arrays are positioned substantially in the same plane. By having the radiating and receiving arrays in the same plane, a simplified manufacture of the antenna module may be obtained.

In a possible implementation form of the first aspect, then for one or both of the antenna modules, the cavity slots on the front side of the columns of the first array are arranged in a first plane, and the cavity slots on the front side of the columns of the second array are arranged in a second plane, and the first and second arrays are positioned with an angle between said first plane and said second plane. This angle should be a blunt or abuse angle, which may be closer to 180° than to 90°. By having the radiating and receiving arrays in angled planes, a higher scanning coverage may be obtained.

In a possible implementation form of the first aspect, the cavity slots on the front side of the columns of the second antenna array of the first antenna module are arranged in a partially upwards facing plane having a first acute angle to the vertical direction, and the cavity slots on the front side of the columns of the first antenna array of the second module are arranged in a partially upwards facing plane having a second acute angle to the vertical direction. In a possible implementation form of the first aspect, the first acute angle is substantial equal to the second acute angle.

In a possible implementation form of the first aspect, the first and second acute angles are in the range of 10-30°, such as about 20°.

In a possible implementation form of the first aspect, the first and second antenna module are arranged in a mirrored position relative to said plane intersecting the vertical axis of rotation.

In a possible implementation form of the first aspect, the radome has a dome shaped upper part. The dome shape gives an increased mechanical strength.

In a possible implementation form of the first aspect, the radome is made of a material having a high electromagnetic transparency, such as a plastic material, such as a polyethylene (PE) or polypropylene (PP) based material, such as a polyethylene (PE) or polypropylene (PP) based ultra high molecular weight plastic material.

In a possible implementation form of the first aspect, the radome is made of a material having a thickness in the range of 1-3 mm, such as in the range of 1-2 mm or such as in the range of 1-1.5 mm.

When having two back-to-back simultaneously operating antenna modules, it is important to minimize reflection of signals transmitted or radiated from the radiating array of one module to the receiving array of the other module. By reducing the material thickness of the radome, the electromagnetic transparency of the radome is increased, thereby minimizing the internal reflection from the radome. By using a PE or PP based material, such as a PE or PP based ultra high molecular weight plastic material, the electromagnetic transparency of the radome is increased even further.

In a possible implementation form of the first aspect, then for one or both of the antenna modules, an electromagnetic shield or shield plate is arranged substantially parallel to the waveguide columns and between the first lower radiating antenna array and the second upper receiving antenna array, which shield or shield plate may extend outwards from the front side of the antenna module.

In a possible implementation form of the first aspect, the electromagnetic shield or shield plate is an electromagnetic absorbing shield or shield plate. The shield or shield plate may be fully or at least partly covered by an electromagnetic absorbing material.

In a possible implementation form of the first aspect, then for one or both antenna modules, a lower electromagnetic shield or shield plate, which may be an electromagnetic absorbing shield or shield plate, and which may be fully or at least partly covered by an electromagnetic absorbing material, is arranged substantially parallel to the waveguide columns and below the lowermost waveguide column of the first lower radiating antenna array. The lower electromagnetic shield or shield plate may extend outwards from the front side of the antenna module.

In a possible implementation form of the first aspect, then for one or both antenna modules, an upper electromagnetic absorber shield or shield plate, which may be an electromagnetic absorbing shield or shield plate, and which may be fully or at least partly covered by an electromagnetic absorbing material, is arranged substantially parallel to the waveguide columns and above the uppermost waveguide column of the second upper receiving antenna array. The upper electromagnetic shield or shield plate may extend outwards from the front side of the antenna module.

In a possible implementation form of the first aspect, the electromagnetic absorber shield or electromagnetic absorbing material comprises a carbon loaded foam material, such as a carbon loaded foam tape.

In a possible implementation form of the first aspect, the electromagnetic absorber shield or electromagnetic absorbing material has a thickness in the range of 4-12 mm, such as in the range of 5-10 mm, such as in the range of 5-8 mm, such as about 6 mm.

In a possible implementation form of the first aspect, then for one or both antenna modules, the first antenna array holds a number of parallel plate blinds secured to the front side of the first antenna array besides or between the cavity slots and substantially perpendicular to the longitudinal direction of the waveguide columns of the first antenna array.

In a possible implementation form of the first aspect, then for one or both antenna modules, the second antenna array holds a number of parallel plate blinds secured to the front side of the second antenna array besides or between the cavity slots and substantially perpendicular to the longitudinal direction of the waveguide columns of the second antenna array.

The plate blinds are vertical blinds or baffles for reducing electromagnetic power radiated in the cross-polarization, that is blinds or baffles for cross-polarization suppression. The plate blinds may be substantially U-shaped with two parallel side plates and a bottom plate.

By having the electromagnetic absorbing shield between the radiating array and the receiving array, and by having the lower and upper electromagnetic absorbing shields, the internal reflection of electromagnetic signals between and alongside the vertical plate blinds is reduced.

In a possible implementation form of the first aspect, each or at least part of the plate blinds is secured to the front side of the corresponding antenna array by one or more sliding dovetail joints.

The tail of a dovetail joint may be formed at a bottom part of the plate blind and the socket of the dovetail joint may be formed in at least the outermost positioned waveguide columns of the antenna array. The waveguide columns with no dovetail socket may hold a cut-out corresponding to the width of the bottom of the plate blinds. The use of dovetail joints and cut-outs serves to increase the mechanical stabilization of the arrays, and to keep the waveguide columns in alignment.

In a possible implementation form of the first aspect, then for one or both antenna modules, the waveguide columns of the first and second antenna arrays are of equal length.

In a possible implementation form of the first aspect, then for one or both antenna modules, the first ends of the waveguide columns of both the first and second antenna arrays are aligned in a direction perpendicular to the longitudinal direction of the waveguide columns, and the second ends of the waveguide columns of both the first and second antenna arrays are also aligned in a direction perpendicular to the longitudinal direction of the waveguide columns.

In a possible implementation form of the first aspect, then for one or both antenna modules, the waveguide columns of both the first and second antenna arrays hold an absorbing load within the second column end.

By having aligned waveguide columns with absorbing loads, the antenna arrays may function in the travelling wave mode.

In a possible implementation form of the first aspect, then for one or both antenna modules, the number of waveguide columns in the second receiving array is larger than the number of waveguide columns in the first radiating array.

In a possible implementation form of the first aspect, then for one or both antenna modules, the number of waveguide columns in the second receiving array is twice the number of waveguide columns in the first radiating array.

In a possible implementation form of the first aspect, then for one or both antenna modules, the first radiating array comprises four waveguide columns, and the second receiving array comprises eight waveguide columns.

In a possible implementation form of the first aspect, then for one or both antenna modules, a radiating signal probe is operably disposed in each column of the first antenna array, and a receiving signal probe is operably disposed in each column of the second antenna array.

In a possible implementation form of the first aspect, then for each waveguide column holding a signal probe, the signal probe is disposed proximal to the first end of the waveguide column. The signal probes may be loop probes with a loop or an open-ended loop for emitting and/or receiving the electromagnetic signal.

In a possible implementation form of the first aspect, the system further comprises a signal generating system holding a single signal generator, and the first antenna module holds first electronic transmit circuitry configured for feeding the first radiating array of the first antenna module to radiate first electromagnetic signals, and the second antenna module holds second electronic transmit circuitry configured for feeding the first radiating array of the second antenna module to radiate second electromagnetic signals, said first and second electromagnetic signals being fully synchronized electromagnetic signals based at least partly on signals provided by said single signal generator.

In a possible implementation form of the first aspect, the first antenna module holds first electronic receive circuitry configured for processing signals received by the second receiving array of the first antenna module, and the second antenna module holds second electronic receive circuitry configured for processing signals received by the second receiving array of the second antenna module, said first and second electronic receive circuitry being configured for processing the received signals in synchronization with the radiated electromagnetic signals, said synchronization being based on signals provided by the single signal generator.

In a possible implementation form of the first aspect, the system further comprises:
  first processing circuitry for processing signals received by the first antenna module, said first processing circuitry being configured to provide first type radar plots of detected objects presented by said signals received by the first antenna module; and
  second processing circuitry for processing signals received by the second antenna module, said second processing circuitry being configured to provide second type radar plots of detected objects presented by said signals received by the second antenna module.

In a possible implementation form of the first aspect, the system further comprises:
  radar track processing circuitry, said radar track processing circuitry being configured to provide a radar track for a detected object based on both the first and the second type radar plots.

According to a second aspect there is provided a radar antenna module comprising:
  a first planar slotted waveguide antenna array configured for radiating electromagnetic waves; and
  a second slotted waveguide antenna array configured for receiving electromagnetic waves;
  wherein each planar slotted waveguide antenna array comprises several longitudinal extending waveguide columns disposed in a parallel and adjacent position with respect to one another, said waveguide columns having a front side and a rear side with a plurality of cavity slots on the front side, and said waveguide columns further having first and second column ends; and
    wherein the first and second antenna arrays are arranged with the waveguide columns of the first antenna array disposed in a parallel position to the waveguide columns of the second antenna array.

In a possible implementation form of the second aspect, the front side of the columns holding the cavity slots of both the first and second planar arrays are positioned substantially in the same plane. By having the radiating and receiving arrays in the same plane, a simplified manufacture of the antenna module may be obtained.

In a possible implementation form of the second aspect, the cavity slots on the front side of the columns of the first array are arranged in a first plane, and the cavity slots on the front side of the columns of the second array are arranged in a second plane, and the first and second arrays are positioned with an angle between said first plane and said second plane. This angle should be a blunt or abuse angle, which may be closer to 180° than to 90°. By having the radiating and receiving arrays in angled planes, a higher scanning coverage may be obtained.

In a possible implementation form of the second aspect, the first planar antenna array is a narrow sided slotted waveguide antenna array configured for radiating horizontal polarized electromagnetic waves, and the second planar antenna array is a narrow sided slotted waveguide antenna array configured for receiving horizontal polarized electromagnetic waves.

In a possible implementation form of the second aspect, the waveguide columns of the first and second antenna arrays are of equal length.

In a possible implementation form of the second aspect, an electromagnetic shield or shield plate is arranged substantially parallel to the waveguide columns and between the first radiating antenna array and the second receiving antenna array, which electromagnetic shield or shield plate may extend outwards from the front side of the antenna module.

In a possible implementation form of the second aspect, the electromagnetic shield or shield plate is an electromagnetic absorbing shield or shield plate, or the shield or shield plate is fully or at least partly covered by an electromagnetic absorbing material.

In a possible implementation form of the second aspect, the first planar slotted waveguide antenna array is positioned as a lower radiating antenna array, and the second slotted waveguide antenna array is positioned above the first array as an upper receiving antenna array.

In a possible implementation form of the second aspect, a first or lower electromagnetic shield or shield plate, which may be a first or lower electromagnetic absorbing shield or shield plate, and which may be fully or at least partly covered by an electromagnetic absorbing material, is arranged substantially parallel to the waveguide columns and below the lowermost waveguide column of the first lower radiating antenna array. This first or lower electromagnetic shield or shield plate may extend outwards from the front side of the antenna module.

In a possible implementation form of the second aspect, a second or upper electromagnetic shield or shield plate, which may be a second or upper electromagnetic absorbing shield or shield plate, and which may be fully or at least partly covered by an electromagnetic absorbing material, is arranged substantially parallel to the waveguide columns and above the uppermost waveguide column of the second upper receiving antenna array. This electromagnetic second or upper electromagnetic shield or shield plate may extend outwards from the front side of the antenna module.

In a possible implementation form of the second aspect, the electromagnetic absorber shield or electromagnetic absorbing material comprises a carbon loaded foam material, such as a carbon loaded foam tape.

In a possible implementation form of the second aspect, the electromagnetic absorber shield or electromagnetic absorbing material has a thickness in the range of 4-12 mm, such as in the range of 5-10 mm, such as in the range of 5-8 mm, such as about 6 mm.

In a possible implementation form of the second aspect, the first antenna array holds a number of parallel plate blinds secured to the front side of the first antenna array besides or between the cavity slots and substantially perpendicular to the longitudinal direction of the waveguide columns of the first antenna array.

In a possible implementation form of the second aspect, the second antenna array holds a number of parallel plate blinds secured to the front side of the second antenna array besides or between the cavity slots and substantially perpendicular to the longitudinal direction of the waveguide columns of the second antenna array. The plate blinds are vertical blinds or baffles for reducing electromagnetic power radiated in the cross-polarization, that is blinds or baffles for cross-polarization suppression. The plate blinds may be substantially U-shaped with two parallel side plates and a bottom plate.

By having the electromagnetic absorbing shield between the radiating array and the receiving array, and by having the lower and upper electromagnetic absorbing shields, the internal reflection of electromagnetic signals between and alongside the vertical plate blinds is reduced.

In a possible implementation form of the second aspect, each or at least part of the plate blinds is secured to the front side of the corresponding antenna array by one or more sliding dovetail joints. The tail of a dovetail joint may be formed at a bottom part of the plate blind and the socket of the dovetail joint may be formed in at least the outermost positioned waveguide columns of the antenna array. The waveguide columns with no dovetail socket may hold a cut-out corresponding to the width of the bottom of the plate blinds. The use of dovetail joints and cut-outs serves to increase the mechanical stabilization of the arrays, and to keep the waveguide columns in alignment.

In a possible implementation form of the second aspect, the first ends of the waveguide columns of both the first and second antenna arrays are aligned in a direction perpendicular to the longitudinal direction of the waveguide columns, and the second ends of the waveguide columns of both the first and second antenna arrays are also aligned in a direction perpendicular to the longitudinal direction of the waveguide columns.

In a possible implementation form of the second aspect, the waveguide columns of both the first and second antenna arrays hold an absorbing load within the second column end. By having aligned waveguide columns with absorbing loads, the antenna arrays may function in the travelling wave mode.

In a possible implementation form of the second aspect, the number of waveguide columns in the second receiving array is larger than the number of waveguide columns in the first radiating array. In a possible implementation form of the second aspect, the number of waveguide columns in the second receiving array is twice the number of waveguide columns in the first radiating array. In a possible implementation form of the second aspect, the for one or both antenna modules, the first radiating array comprises four waveguide columns, and the second receiving array comprises eight waveguide columns.

In a possible implementation form of the second aspect, a radiating signal probe is operably disposed in each column of the first antenna array, and a receiving signal probe is operably disposed in each column of the second antenna array. In a possible implementation form of the second aspect, then for each waveguide column holding a signal probe, the signal probe is disposed proximal to the first end of the waveguide column. The signal probes may be loop probes with a loop or an open-ended loop for emitting and/or receiving the electromagnetic signal.

A back-to-back radar antenna system may be provided by using two radar antenna modules, where each antenna module is selected from the possible implementation forms of the antenna module according to the second aspect.

It is an object of the aspects of the disclosed embodiments to provide a cavity slotted-waveguide antenna array system, which reduces false reflections from the radiating antenna to the receiving antenna.

According to a third aspect there is provided a radar system comprising a first radar antenna module comprising:
 a first planar slotted waveguide antenna array configured for radiating electromagnetic waves, and
 a second planar slotted waveguide antenna array configured for receiving electromagnetic waves, wherein:

each planar slotted waveguide antenna array comprises several longitudinal extending waveguide columns disposed in a parallel and adjacent position with respect to one another, said waveguide columns having a front side and a rear side with a plurality of cavity slots on the front side, and said waveguide columns further having first and second column ends;

the waveguide columns of the first and second antenna arrays have equal internal height and equal internal width;

the first and second antenna arrays are arranged with the waveguide columns of the first antenna array disposed in a parallel position to the waveguide columns of the second antenna array;

the front side of the columns holding the cavity slots of the first planar antenna array are positioned in a first plane and the front side of the columns holding the cavity slots of the second planar antenna array are positioned in a second plane parallel to said first plane; and the first and second antenna arrays are positioned at a distance to each other with a longitudinal extending outer sidewall of an outermost waveguide column of the first array arranged closest to a longitudinal extending outer sidewall of an outermost waveguide column of the second array, said closest outer sidewalls of the outermost columns of the first and second antenna arrays positioned with a minimum parallel column distance to each other in a direction parallel to the first and second planes, said minimum parallel column distance being at least 10 times the internal width of the waveguide columns.

By having the first radiating antenna array and the second receiving antenna array offset to each other in a direction parallel to the first and second planes, the amount of false reflections from the radiating antenna array reaching the receiving antenna array will be reduced, thereby improving the signal to noise ratio.

In a possible implementation form of the third aspect, said minimum parallel column distance is at least 12 times or at least 15 times the internal width of the waveguide columns.

In a possible implementation form of the third aspect, the first and second parallel planes are offset with a minimum perpendicular array distance to each other in a direction perpendicular to said planes. In a possible implementation form of the third aspect, said minimum perpendicular array distance is at least 3 times or at least 5 times the internal width of said waveguide columns.

According to a fourth aspect there is provided a radar system comprising a first radar antenna module comprising:
a first planar slotted waveguide antenna array configured for radiating electromagnetic waves, and
a second planar slotted waveguide antenna array configured for receiving electromagnetic waves, wherein:
each planar slotted waveguide antenna array comprises several longitudinal extending waveguide columns disposed in a parallel and adjacent position with respect to one another, said waveguide columns having a front side and a rear side with a plurality of cavity slots on the front side, and said waveguide columns further having first and second column ends;
the waveguide columns of the first and second antenna arrays have equal internal height and equal internal width;
the first and second antenna arrays are arranged with the waveguide columns of the first antenna array disposed in a parallel position to the waveguide columns of the second antenna array;
the front side of the columns holding the cavity slots of the first planar antenna array are positioned in a first plane and the front side of the columns holding the cavity slots of the second planar antenna array are positioned in a second plane parallel to said first plane; and
the first and second parallel planes are offset with a minimum perpendicular array distance to each other in a direction perpendicular to said planes.

In a possible implementation form of the fourth aspect, said minimum perpendicular array distance is at least 3 times or at least 5 times the internal width of said waveguide columns.

By having the first radiating antenna array and the second receiving antenna array offset to each other in the direction perpendicular to the first and second planes, the resulting antenna module may take up less space in the horizontal direction, which is useful when the antenna module is used in a rotating antenna system. Furthermore, by having the first radiating antenna array and the second receiving antenna array offset to each other in the direction perpendicular to the first and second planes, the amount of false reflections from the radiating antenna array reaching the receiving antenna array may be reduced, thereby improving the signal to noise ratio.

In a possible implementation form of the fourth aspect, the first antenna and second antenna arrays are positioned at a distance to each other with a longitudinal extending outer sidewall of an outermost waveguide column of the first array arranged closest to a longitudinal extending outer sidewall of an outermost waveguide column of the second array, said closest outer sidewalls of the outermost columns of the first and second antenna arrays positioned with a minimum parallel column distance to each other in a direction parallel to the first and second planes, said minimum parallel column distance being at least 2 times the internal width of the waveguide columns. In a possible implementation form of the fourth aspect, said minimum parallel column distance is at least 3 times, such as at least 5 times, such as at least 10 times, such as at 12 times or at least 15 times the internal width of the waveguide columns.

In a possible implementation form of the third aspect or in a possible implementation form of the fourth aspect, the front sides of the first and second antenna arrays face the same direction being a front direction of the antenna module.

In a possible implementation form of the third aspect or in a possible implementation form of the fourth aspect, the first plane is offset from the second plane by the perpendicular array distance in a direction opposite to said front direction.

In a possible implementation form of the third aspect or in a possible implementation form of the fourth aspect, the first antenna array has a first longitudinal extending outermost array sidewall closest to a second longitudinal extending outermost array sidewall of the second antenna array, said closest first and second outermost array sidewalls positioned with a minimum parallel array distance to each other in a direction parallel to the first and second planes, said minimum parallel array distance being smaller than or equal to the minimum parallel column distance.

In a possible implementation form of the third aspect or in a possible implementation form of the fourth aspect, the first outer array sidewall is the outer sidewall of the outermost waveguide column of the first array, and the second outer array sidewall is the outer sidewall of the outermost waveguide column of the second array.

In a possible implementation form of the third aspect or in a possible implementation form of the fourth aspect, the first outer array sidewall is an outer sidewall of a first spacer part connected to said outermost waveguide column of the first antenna array, and the second outer array sidewall is an outer sidewall of a second spacer part connected to said outermost waveguide column of the second antenna array.

In a possible implementation form of the third aspect or in a possible implementation form of the fourth aspect, one or more electromagnetic shield(s) is/are arranged between the first radiating antenna array and the second receiving antenna array.

In a possible implementation form of the third aspect or in a possible implementation form of the fourth aspect, the front sides of the first and second antenna arrays face the same direction being a front direction of the antenna module, and at least a part of the electromagnetic shields extends outwards from the front side of the antenna module.

In a possible implementation form of the third aspect or in a possible implementation form of the fourth aspect, the one or more electromagnetic shields comprise a first shield plate and a second shield plate with both shield plates having a first direction of extension and a second direction of extension perpendicular to the first direction of extension. In a possible implementation form of the third aspect or in a possible implementation for of the fourth aspect, the first direction of extension for both shield plates is parallel to the longitudinal extension of the waveguides.

In a possible implementation form of the third aspect or in a possible implementation form of the fourth aspect, the first shield plate has a first outer edge in contact with said first outermost array sidewall of the first array and the second shield plate has a first outer edge in contact with said second outermost array sidewall of the second array.

In a possible implementation form of the third aspect or in a possible implementation form of the fourth aspect, the second direction of extension of the first shield plate has a first obtuse angle to the front side of the first array and the second direction of extension of the second shield plate has a second obtuse angle to the front side of the second array.

In a possible implementation form of the third aspect or in a possible implementation form of the fourth aspect, the second direction of extension of the first shield plate differs from the second direction of extension of the second shield plate, and the second direction of extension of the first shield plate forms a first acute angle to the second direction of extension of the second shield plate.

In a possible implementation form of the third aspect or in a possible implementation form of the fourth aspect, the first and second shield plates reach a point or line of contact along said second directions of extension.

In a possible implementation form of the third aspect or in a possible implementation form of the fourth aspect, the first shield plate has a first maximum length of extension in its second direction of extension and the second shield plate has a second maximum length of extension in its second direction extension, said first and second maximum lengths of extension being defined by a point or line of contact between the first and second shields plates.

In a possible implementation form of the third aspect or in a possible implementation form of the fourth aspect, the first antenna array has a second longitudinal extending outer array sidewall opposite to said first outer array sidewall, and a third shield plate is arranged in contact with said second longitudinal extending outer array sidewall of the first array, said third shield plate extending outwards from the front side of the first antenna array.

In a possible implementation form of the third aspect or in a possible implementation form of the fourth aspect, the third shield plate has a first and a second direction of extension, and the first direction of extension of the third shield plate is parallel to the longitudinal extension of the waveguides.

In a possible implementation form of the third aspect or in a possible implementation form of the fourth aspect, the second direction of extension of the third shield plate differs from the second direction of extension of the first shield plate, and the second direction of extension of the third shield plate has a third obtuse angle to the front side of the first array.

In a possible implementation form of the third aspect or in a possible implementation form of the fourth aspect, the first, second and/or third obtuse angles are in the range of 100° to 140°, such as 120°.

In a possible implementation form of the third aspect or in a possible implementation form of the fourth aspect, the first acute angle is in the range of 40° to 80°, such as 60°.

In a possible implementation form of the third aspect or in a possible implementation form of the fourth aspect, the first planar antenna array is a narrow sided slotted waveguide antenna array configured for radiating horizontal polarized electromagnetic waves, and the second planar antenna array is a narrow sided slotted waveguide antenna array configured for receiving horizontal polarized electromagnetic waves.

In a possible implementation form of the third aspect or in a possible implementation form of the fourth aspect, the waveguide columns of the first and second antenna arrays are of equal length.

In a possible implementation form of the third aspect or in a possible implementation form of the fourth aspect, the first antenna array holds a number of parallel plate blinds secured to the front side of the first antenna array besides or between the cavity slots and substantially perpendicular to the longitudinal direction of the waveguide columns of the first antenna array.

In a possible implementation form of the third aspect or in a possible implementation form of the fourth aspect, the second antenna array holds a number of parallel plate blinds secured to the front side of the second antenna array besides or between the cavity slots and substantially perpendicular to the longitudinal direction of the waveguide columns of the second antenna array. The plate blinds are vertical blinds or baffles for reducing electromagnetic power radiated in the cross-polarization, that is blinds or baffles for cross-polarization suppression. The plate blinds may be substantially U-shaped with two parallel side plates and a bottom plate.

In a possible implementation form of the third aspect or in a possible implementation form of the fourth aspect, the number of waveguide columns in the second receiving array is larger than the number of waveguide columns in the first radiating array. In a possible implementation form of the third aspect or in a possible implementation form of the fourth aspect, the number of waveguide columns in the second receiving array is twice the number of waveguide columns in the first radiating array. In a possible implementation form of the third aspect or in a possible implementation form of the fourth aspect, the first radiating array comprises four waveguide columns, and the second receiving array comprises eight waveguide columns.

In a possible implementation form of the third aspect or in a possible implementation form of the fourth aspect, the radar system further comprises a rotation system configured for supporting and rotating the first antenna module around a vertical axis.

In a possible implementation form of the third aspect or in a possible implementation form of the fourth aspect, the first radar antenna module is secured to the rotation system with the first and second planar antenna arrays positioned with the first and second planes holding a second acute angle to the vertical axis of rotation.

In a possible implementation form of the third aspect or in a possible implementation form of the fourth aspect, the radar system further comprises a second radar antenna module being configured and dimensioned equal to the first radar antenna module, said second radar antenna module being supported by the rotation system with the first and second antenna modules arranged in a back-to-back position on opposite sides of a plane intersecting the axis of rotation, and with the rear side of the waveguide columns of the antenna arrays of the first antenna module facing the rear side of the waveguide columns of the antenna arrays of the second antenna module.

By having a rotating radar system with two back-to-back positioned antenna modules, it is possible to decrease the speed of rotation to half the speed of a rotating radar system, which comprises only a single radar module, while still having the same speed of update of radar tracks obtained from received signals being reflected from detected objects or targets. By lowering the speed of rotation, a higher signal exposure time on target is obtained, resulting in a higher signal to noise ratio, which again results in more information of any detected target or object.

In a possible implementation form of the third aspect or in a possible implementation form of the fourth aspect, the second radar antenna module is secured to the rotation system with its first and second planar antenna arrays positioned with the first and second planes holding said second acute angle to the vertical axis of rotation.

In a possible implementation form of the third aspect or in a possible implementation form of the fourth aspect, the second acute angle is in the range of 15° to 25°, such as 20°.

In a possible implementation form of the third aspect or in a possible implementation form of the fourth aspect, the first and second antenna arrays of each radar antenna module are positioned with said first and second longitudinal extending outermost array sidewalls reaching a single axis parallel to said vertical axis of rotation.

In a possible implementation form of the third aspect or in a possible implementation form of the fourth aspect, the radar system further comprises a protective housing in the form of a radome covering said antenna module(s).

In a possible implementation form of the third aspect or in a possible implementation form of the fourth aspect, the radome has a cylindrically shaped wall part surrounding the antenna module(s), said wall part being slightly inclined towards the antenna module(s) forming a small acute inclination angle to said axis of rotation, said small acute angle being no larger than 10°, such as no larger than 5, such as about 3°.

In a possible implementation form of the third aspect or in a possible implementation form of the fourth aspect, the first and second shield plates of a radar antenna module each have a second outer edge proximate the cylindrically wall part of the radome, said second outer edges being curve shaped to follow the interior of the cylindrically shaped radome.

In a possible implementation form of the third aspect or in a possible implementation form of the fourth aspect, the third shield plate of a radar antenna module has a second outer edge proximate the cylindrically wall part of the radome, said second outer edge being curve shaped to follow the interior of the cylindrically shaped radome.

In a possible implementation form of the third aspect or in a possible implementation form of the fourth aspect, the distance between the second outer edge of one said shield plates and the interior of the cylindrically shaped wall part of the radome is no larger than 15 mm, such as no larger than 10 mm, such as no larger than 8 mm.

In a possible implementation form of the third aspect or in a possible implementation form of the fourth aspect, the first and second antenna modules are arranged in a mirrored position relative to said plane intersecting the vertical axis of rotation.

In a possible implementation form of the third aspect or in a possible implementation form of the fourth aspect, the radome is made of a material having a high electromagnetic transparency, such as made of a polyethylene (PE) or polypropylene (PP) based ultra high molecular weight plastic material.

In a possible implementation form of the third aspect or in a possible implementation form of the fourth aspect, the radome is made of a material having a thickness in the range of 1-3 mm, such as in the range of 1-2 mm or such as in the range of 1-1.5 mm.

When having two back-to-back simultaneously operating antenna modules, it is important to minimize reflection of signals transmitted or radiated from the radiating array of one module to the receiving array of the other module. By reducing the material thickness of the radome, the electromagnetic transparency of the radome is increased, thereby minimizing the internal reflection from the radome. By using a PE or PP based material, such as a PE or PP based ultra high molecular weight plastic material, the electromagnetic transparency of the radome is increased even further.

In a possible implementation form of the third aspect or in a possible implementation form of the fourth aspect, the system further comprises a signal generating system holding a single signal generator, and the first antenna module holds first electronic transmit circuitry configured for feeding the first radiating array of the first antenna module to radiate first electromagnetic signals, and the second antenna module holds second electronic transmit circuitry configured for feeding the first radiating array of the second antenna module to radiate second electromagnetic signals, said first and second electromagnetic signals being fully synchronized electromagnetic signals based at least partly on signals provided by said single signal generator.

In a possible implementation form of the third aspect or in a possible implementation form of the fourth aspect, the first antenna module holds first electronic receive circuitry configured for processing signals received by the second receiving array of the first antenna module, and the second antenna module holds second electronic receive circuitry configured for processing signals received by the second receiving array of the second antenna module, said first and second electronic receive circuitry being configured for processing the received signals in synchronization with the radiated electromagnetic signals, said synchronization being based on signals provided by the single signal generator.

In a possible implementation form of the third aspect or in a possible implementation form of the fourth aspect, the system further comprises:

first processing circuitry for processing signals received by the first antenna module, said first processing circuitry being configured to provide first type radar plots of detected objects presented by said signals received by the first antenna module; and second processing circuitry for processing signals received by the second antenna module, said second processing circuitry being configured to provide second type radar plots of detected objects presented by said signals received by the second antenna module.

In a possible implementation form of the third aspect or in a possible implementation form of the fourth aspect, the system further comprises:

radar track processing circuitry, said radar track processing circuitry being configured to provide a radar track for a detected object based on both the first and the second type radar plots.

The foregoing and other objects are achieved by the features of the independent claims. Further implementation forms are apparent from the dependent claims, the description and the figures. These and other aspects of the disclosed embodiments will be apparent from the embodiments described below.

BRIEF DESCRIPTION OF THE DRAWINGS

In the following detailed portion of the present disclosure, the disclosed embodiments will be explained in more detail with reference to the example embodiments shown in the drawings, in which:

FIGS. 15a-15i illustrate scanning of four moving object using a radar system holding two back-to-back antenna modules according to an example embodiment;

FIG. 16 is a table giving an overview of the scanning illustrated in FIGS. 15a-15i.

DETAILED DESCRIPTION

Figure 1A:
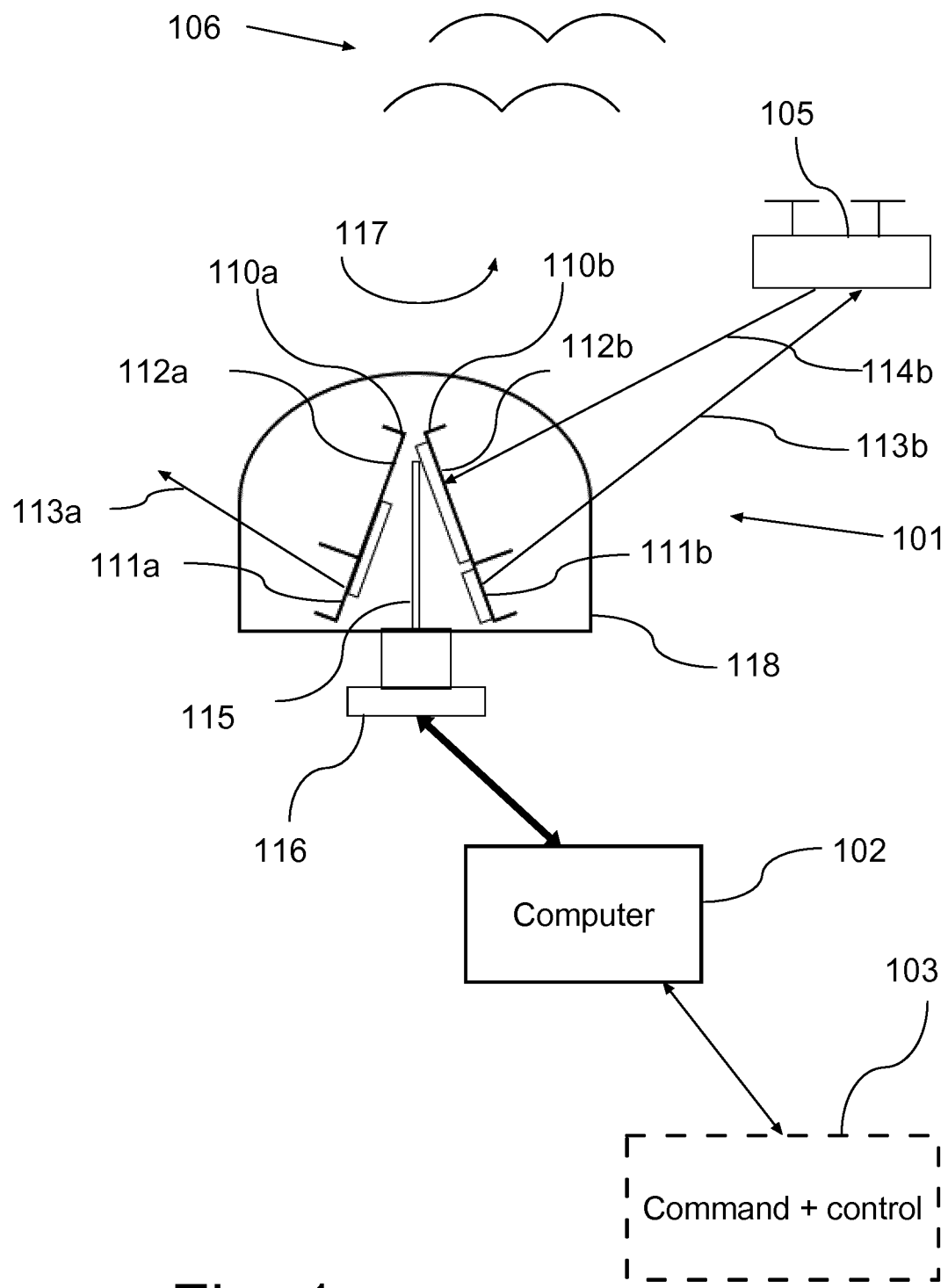
FIG. 1a is a schematic block diagram illustrating the basic structure of a scanning radar system according to a first example embodiment.

FIG. 1a is a schematic block diagram illustrating the basic structure of a scanning radar system according to a first example embodiment. The system comprises a rotating scanning radar system 101, which is configured to operate as a Frequency Modulated Continuous Wave, FMCW, radar system. The scanning radar system 101 is electronically connected to a computer system 102. Generated output data may be communicated to an external command and control system 103, where the data may be communicated by live data streaming, where for example Extensible Markup Language, XML, may be used for streaming.

The scanning radar system 101 holds two back-to-back positioned antenna modules, a first antenna module 110a and a second antenna module 110b, where each antenna module 110a, 110b comprises a first planar slotted waveguide antenna array 111a, 111b configured for radiating electromagnetic waves 113a, 113b, and a second planar slotted waveguide antenna array 112a, 112b configured for receiving electromagnetic waves 114b. The antennas modules 110a, 110b are mounted to a rotation system 116 configured for rotating 117 the antenna modules 110a, 110b around a vertical axis 115 at a rotational speed. By having the two simultaneously operating antenna modules 110a, 110b, which are both operating as a FMCW radar antenna module, a full 360 degree radar image can be obtained for every half rotation of the radar system 101. The rotational speed may be of 30 rounds per minute, rpm, whereby a full 360 degree radar image can be obtained every second.

The targets or objects being exposed to the radar signals may include one or more Unmanned Aerial Vehicles, UAVs, 105 and one or more birds 106.

The antenna modules 110a, 110b are enclosed by a protecting radome 118 having a high electromagnetic transparency in order to minimize reflection of signals transmitted or radiated from the radiating arrays 111a, 111b to the receiving arrays 112b, 112a. In order to obtain a high electromagnetic transparency, the radome should be relatively thin and may be made of a material having a thickness in the range of 1-3 mm, such as in the range of 1-2 mm or such as in the range of 1-1.5 mm. Also in order to obtain a high electromagnetic transparency, the radome may be made of a polyethylene (PE) or polypropylene (PP) based ultra high molecular weight plastic material. When using a relatively thin wall thickness of below 3 mm, such a in the range of 1-1.5 mm, it is preferred that the radome 118 has a dome shaped upper part in order to increase the mechanical strength of the radome 118. The radome 118 is arranged in a fixed position without following the rotation of the rotation system 116 and the antenna modules 110a, 110b. However, it is also within an embodiment that the radome 118 is connected to the rotation system 116 for being rotated together with the antenna modules 110a, 110b.

Figure 1B:
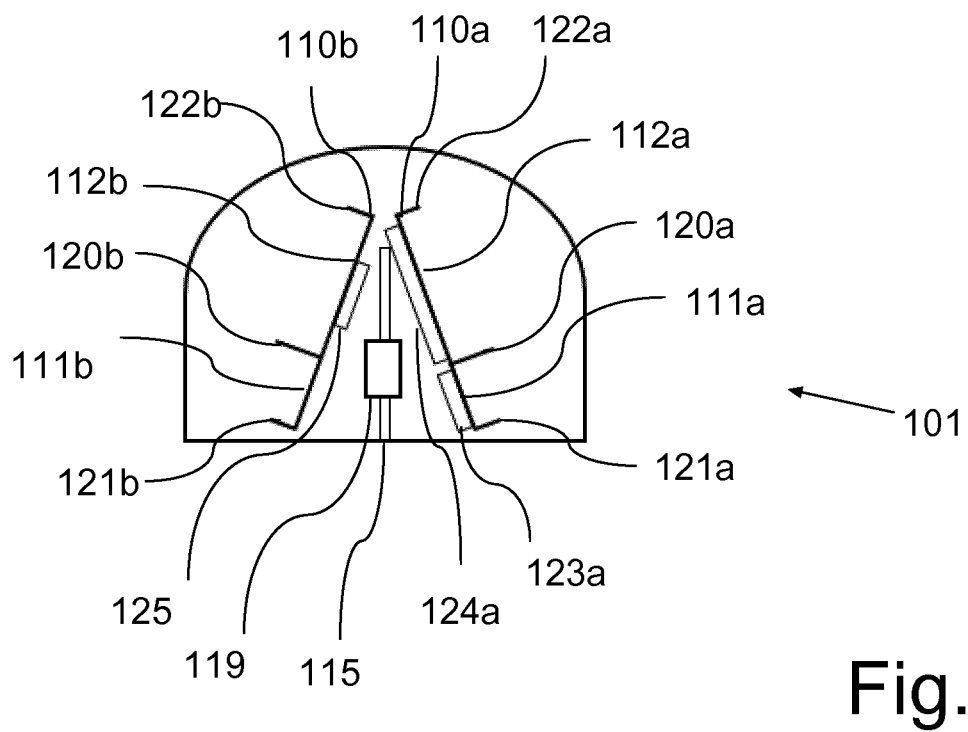
FIGS. 1b and 1c are schematic cross-sectional views illustrating a back-to-back to arrangement of antenna modules for the radar system of FIG. 1a according to an example embodiment.
Figure 1C:
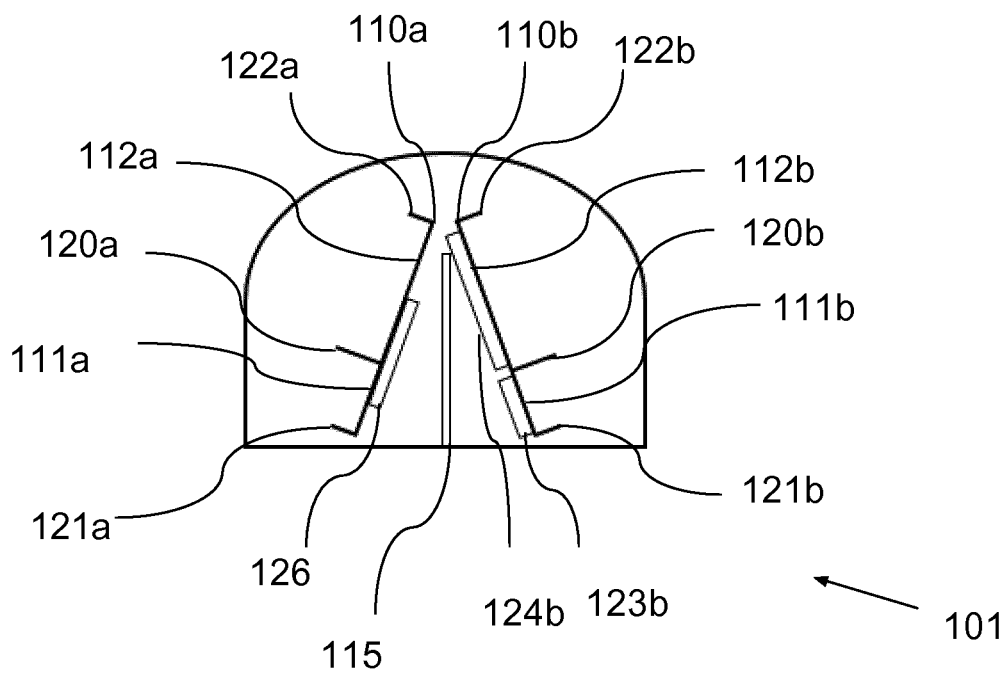

FIGS. 1b and 1c are schematic cross-sectional views illustrating a back-to-back arrangement of the two antenna modules 110a, 110b for the radar system 101 of FIG. 1a according to an example embodiment.

For each of the modules 110a, 110b of FIGS. 1b and 1c, an electromagnetic shield or shield plate 120a, 120b is positioned between the radiating array 111a, 111 b and the receiving array 112a, 112b. A lower electromagnetic shield or shield plate 121a, 121b may be positioned at the lower edge of the radiating array 111a, 111b, and an upper electromagnetic shield or shield plate 122a, 122b may also be positioned at an upper edge of the receiving array 112a, 112b.

The radar system 101 holds on-board circuitry, which includes a signal generating system 125 holding a single signal generator. For the illustrated embodiment of FIGS. 1b and 1c, the signal generating system 125 is positioned at the back of the second antenna module 110b.

Each of the FMCW radar antenna modules 110a, 110b holds electronic on-board circuitry, which includes first electronic transmit circuitry 123a configured for feeding the first radiating array 111a of the first antenna module 110a to radiate first FMCW electromagnetic signals 113a and positioned at the back of the first antenna module 110a, and which includes second electronic transmit circuitry 123b configured for feeding the first radiating array 111b of the second antenna module 110b to radiate second FMCW electromagnetic signals 113b and positioned at the back of the second antenna module 110b. The first and second transmit circuitries 123a, 123b are both being fed with signals from the signal generating system 125 in order to control the first and second electromagnetic signals 113a, 113b to be fully synchronized electromagnetic signals based at least partly on signals provided by the single signal generator of the signal generating system 125.

As part of the electronic on-board circuitry, the first antenna module 110a holds first electronic receive circuitry 124a configured for processing signals received by the second receiving array 112a of the first antenna module 110a, and the second antenna module 110b holds second electronic receive circuitry 124b configured for processing signals received by the second receiving array 112b of the second antenna module 110b. The first electronic receive circuitry 124a is positioned at the back of the first antenna module 110a, and the second electronic receive circuitry 124b is positioned at the back of the second antenna module 110b. The first and second electronic receive circuitry 124a, 124b are configured for processing the received signals in synchronization with the radiated electromagnetic signals 113a, 113b, which synchronization is based on signals provided by the single signal generator of the signal generating system 125.

The on-board circuitry of the radar system 101 also includes a motor controller 119 for controlling the rotation system 116. An azimuth encoder may be provided at the rotation system 116, which encoder is configured for encoding and communicating the degree of rotation, and thereby the azimuth angle of the antenna modules 110a, 110b, at a very high precision. The on-board circuitry also includes signal processing circuitry 126 for performing first on-board processing of signals received from the first receive circuitry 124a, and for performing second on-board processing of signals received from the second receive circuitry 124b, to thereby obtain first digital scan data representing the electromagnetic signals received by the first antenna module 110a, and to obtain second digital scan data representing the electromagnetic signals 114b received by the second antenna module 110b. The signal processing circuitry 126 also provides a control signal to the signal generator system 125.

For the illustrated embodiment of FIGS. 1b and 1c, the signal processing circuitry 126 is positioned at the back of the first antenna module 110a.

The different circuitries of the on-board circuitry, the signal generator system 125, the first and second transmit circuitry 123a, 123b, the first and second receive circuitry 124a, 124b and the signal processing circuitry 126 may be enclosed by an aluminium shield, which shields for electronic noise signals. The on-board signal processing circuitry 126 may be electronically connected to back end circuitry being part of the azimuth encoder for communicating the azimuth angle. The on-board signal processing circuitry 126 and the back end circuitry are electronically connected to the computer system 102, for forwarding the first and second digital scan data together with data for the azimuth angle to the computer system 102. The electronic signals are transferred via a glass fibre cable from the signal processing circuitry 126 to a rotary joint at the rotation system 116, which is further connected to the computer system 102 by cables.

The computer system 102 may hold first processing circuitry for processing the received first digital scan data and azimuth data to provide first type radar plots of detected objects presented by the signals received by the first antenna module, and further hold second processing circuitry for processing the received second digital scan data and azimuth data to provide second type radar plots of detected objects presented by the signals received by the second antenna module. The computer system 102 may also hold radar track processing circuitry configured to provide a radar track for a detected object based on both first and second type radar plots. The computer system 102 may also hold classifying circuitry for classifying the objects of the tracks.

The scanning radar system 101 of FIG. 1a is based on two antenna modules 110a, 110b, where each antenna module comprises a first planar slotted waveguide antenna array 111a, 111b configured for radiating electromagnetic waves 113a, 113b, and a second planar slotted waveguide antenna array 112a, 112b configured for receiving electromagnetic waves 114b.

Figure 2A:
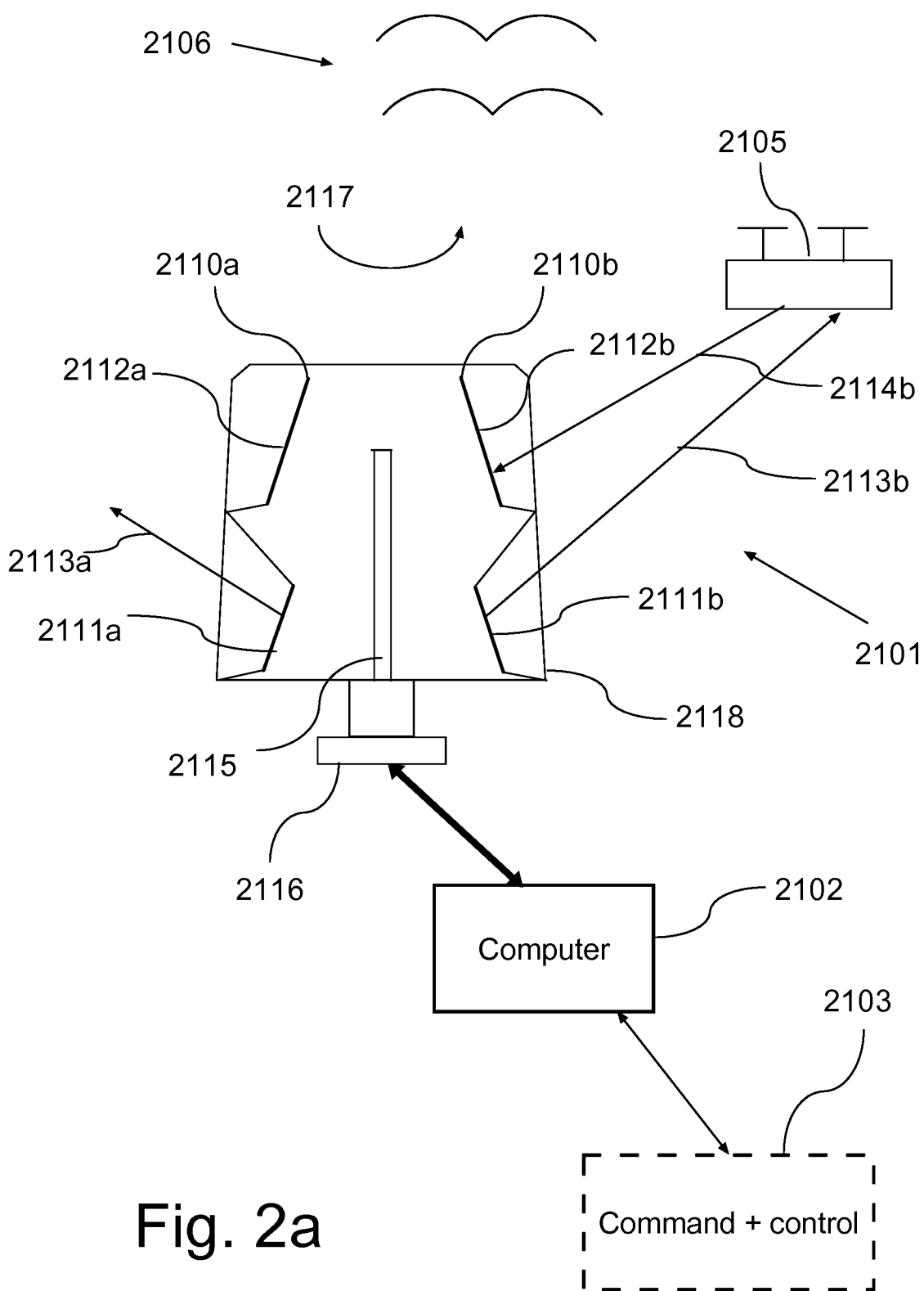
FIG. 2a is a schematic block diagram illustrating the basic structure of a detection system holding a radar system according to a second example embodiment.

FIG. 2a is a schematic block diagram illustrating the basic structure of a detection system holding a radar system according to a second example embodiment. The detection system comprises a rotating scanning radar system 2101, which is configured to operate as a Frequency Modulated Continuous Wave, FMCW, radar system. The scanning radar system 2101 is electronically connected to a computer system 2102. Generated output data may be communicated to an external command and control system 2103, where the data may be communicated by live data streaming, where for example Extensible Markup Language, XML, may be used for streaming.

The scanning radar system 2101 holds two back-to-back positioned antenna modules, a first antenna module 2110*a* and a second antenna module 2110*b*, where each antenna module 2110*a*, 2110*b* comprises a first planar slotted waveguide antenna array 2111*a*, 2111*b* configured for radiating electromagnetic waves 2113*a*, 2113*b*, and a second planar slotted waveguide antenna array 2112*a*, 2112*b* configured for receiving electromagnetic waves 2114*b*. The antennas modules 2110*a*, 2110*b* are mounted to a rotation system 2116 configured for rotating 2117 the antenna modules 2110*a*, 2110*b* around a vertical axis 2115 at a rotational speed. By having the two simultaneously operating antenna modules 2110*a*, 2110*b*, which are both operating as a FMCW radar antenna module, a full 360 degree radar image can be obtained for every half rotation of the radar system 2101. The rotational speed may be of 30 rounds per minute, rpm, whereby a full 360 degree radar image can be obtained every second.

The targets or objects being exposed to the radar signals may include one or more Unmanned Aerial Vehicles, UAVs, 2105 and one or more birds 2106.

The antenna modules 2110*a*, 2110*b* are enclosed by a protecting radome 2118 having a high electromagnetic transparency in order to minimize reflection of signals transmitted or radiated from the radiating arrays 2111*a*, 2111*b* to the receiving arrays 2112*b*, 2112*a*. In order to obtain a high electromagnetic transparency, the radome should be relatively thin and may be made of a material having a thickness in the range of 1-3 mm, such as in the range of 1-2 mm or such as in the range of 1-1.5 mm. Also in order to obtain a high electromagnetic transparency, the radome may be made of a polyethylene (PE) or polypropylene (PP) based ultra high molecular weight plastic material. When using a relatively thin wall thickness of below 3 mm, such a in the range of 1-1.5 mm, it is preferred that the radome 2118 has a dome shaped upper part in order to increase the mechanical strength of the radome 2118. The radome 2118 may be arranged in a fixed position without following the rotation of the rotation system 2116 and the antenna modules 2110*a*, 2110*b*. However, it is also within an embodiment that the radome 2118 is connected to the rotation system 2116 for being rotated together with the antenna modules 2110*a*, 2110*b*.

Figure 2B:
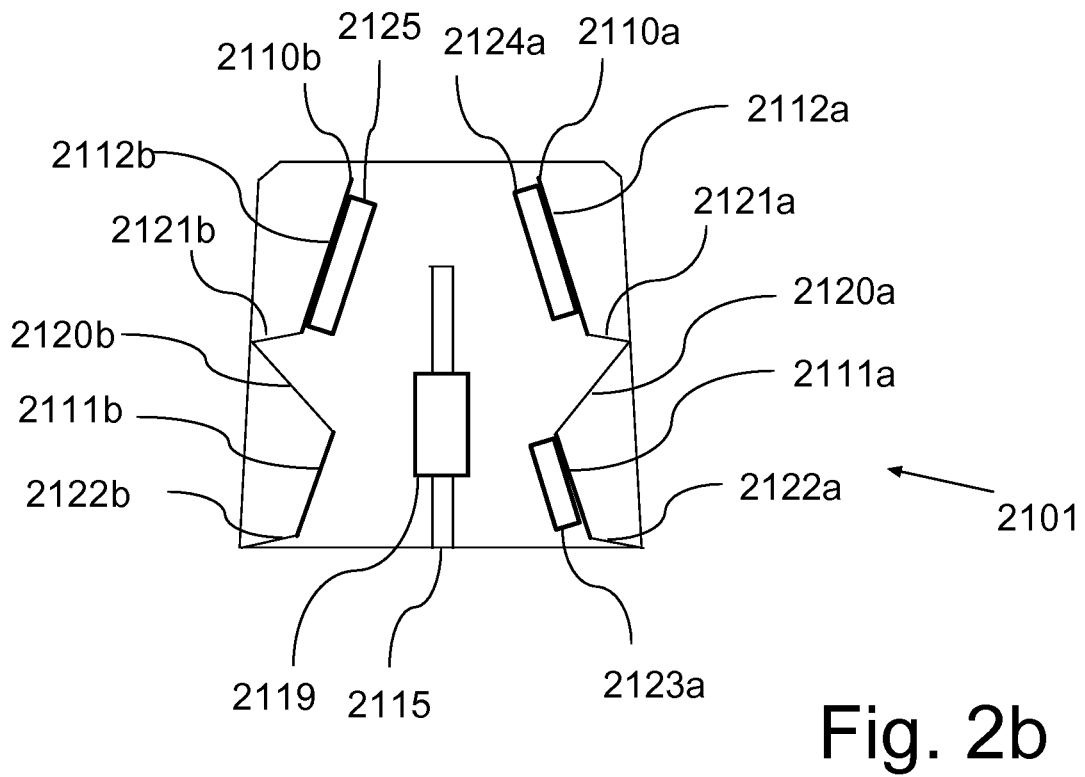
FIGS. 2b and 2c are schematic cross-sectional views illustrating a back-to-back to arrangement of antenna modules for the radar system of FIG. 2a according to an example embodiment.
Figure 2C:
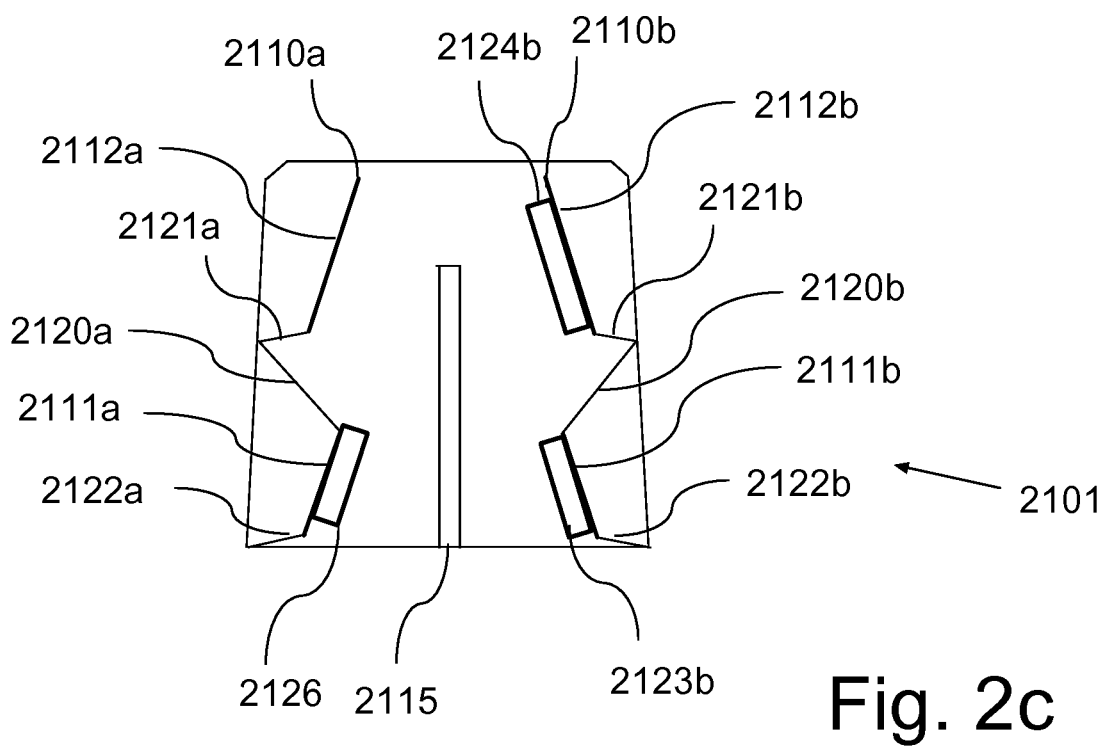

FIGS. 2*b* and 2*c* are schematic cross-sectional views illustrating a back-to-back arrangement of the two antenna modules 2110*a*, 2110*b* for the radar system 2101 of FIG. 2*c* according to an example embodiment.

For each of the antenna modules 2110*a*, 2110*b*, the radiating arrays 2111*a*, 2111*b* are positioned at a distance to the receiving arrays 2112*b*, 2112*a*. The radiating arrays 2111*a*, 2111*b* have a front side positioned in a first plane, and the receiving arrays 2112*b*, 2112*a* have a front side positioned in a second plane, which second plane may be parallel to the first plane. When the first and second planes are parallel to each other, the resulting distance between a radiating array 2111*a*, 2111*b* and a corresponding receiving array 2112*a*, 2112*b* may be composed of a component in a direction parallel to the first and second planes, and a component in a direction perpendicular to the first and second planes.

For each of the modules 2110*a*, 2110*b* of FIGS. 2*b* and 2*c*, a first electromagnetic shield plate 2120*a*, 2120*b* and a second electromagnetic shield plate 2121*a*, 2121*b* are positioned between the radiating array 2111*a*, 2111*b* and the receiving array 2112*a*, 2112*b*. A third electromagnetic shield plate 2122*a*, 2122*b* may also be positioned at a lower edge of the radiating array 2111*a*, 2111*b*, opposite the first electromagnetic shield plate 2121*a*, 2121*b*.

The radar system 2101 may hold on-board circuitry, which may include a signal generating system 2125 holding a single signal generator. For the illustrated embodiment of FIGS. 2*b* and 2*c*, the signal generating system 2125 is positioned at the back of the second antenna module 2110*b*.

Each of the FMCW radar antenna modules 2110*a*, 2110*b* may hold electronic on-board circuitry, which includes first electronic transmit circuitry 2123*a* configured for feeding the first radiating array 2111*a* of the first antenna module 2110*a* to radiate first FMCW electromagnetic signals 2113*a* and positioned at the back of the first antenna module 2110*a*, and which may include second electronic transmit circuitry 2123*b* configured for feeding the first radiating array 2111*b* of the second antenna module 2110*b* to radiate second FMCW electromagnetic signals 2113*b* and positioned at the back of the second antenna module 2110*b*. The first and second transmit circuitries 2123*a*, 2123*b* may both be fed with signals from the signal generating system 2125 in order to control the first and second electromagnetic signals 2113*a*, 2113*b* to be fully synchronized electromagnetic signals based at least partly on signals provided by the single signal generator of the signal generating system 2125.

As part of the electronic on-board circuitry, the first antenna module 2110*a* may hold first electronic receive circuitry 2124*a* configured for processing signals received by the second receiving array 2112*a* of the first antenna module 2110*a*, and the second antenna module 2110*b* may hold second electronic receive circuitry 2124*b* configured for processing signals received by the second receiving array 2112*b* of the second antenna module 2110*b*. The first electronic receive circuitry 2124*a* may be positioned at the back of the first antenna module 2110*a*, and the second electronic receive circuitry 2124*b* may be positioned at the back of the second antenna module 2110*b*. The first and second electronic receive circuitry 2124*a*, 2124*b* may be configured for processing the received signals in synchronization with the radiated electromagnetic signals 2113*a*, 2113*b*, which synchronization may be based on signals provided by the single signal generator of the signal generating system 2125.

The on-board circuitry of the radar system 2101 may also include a motor controller 2119 for controlling the rotation system 2116. An azimuth encoder may be provided at the rotation system 2116, which encoder may be configured for encoding and communicating the degree of rotation, and thereby the azimuth angle of the antenna modules 2110*a*, 2110*b*, at a very high precision. The on-board circuitry may also include signal processing circuitry 2126 for performing first on-board processing of signals received from the first receive circuitry 2124*a*, and for performing second on-board processing of signals received from the second receive circuitry 2124*b*, to thereby obtain first digital scan data representing the electromagnetic signals received by the first antenna module 2110*a*, and to obtain second digital scan data representing the electromagnetic signals 2114*b* received by the second antenna module 2110*b*. The signal processing circuitry 2126 may also provide a control signal to the signal generator system 2125.

For the illustrated embodiment of FIGS. 2*b* and 2*c*, the signal processing circuitry 2126 is positioned at the back of the first antenna module 2110*a*.

The different circuitries of the on-board circuitry, the signal generator system 2125, the first and second transmit circuitry 2123a, 2123b, the first and second receive circuitry 2124a, 2124b and the signal processing circuitry 2126 may be enclosed by an aluminium shield, which shields for electronic noise signals. The on-board signal processing circuitry 2126 may be electronically connected to back-end circuitry being part of the azimuth encoder for communicating the azimuth angle. The on-board signal processing circuitry 2126 and the back-end circuitry may be electronically connected to the computer system 2102, for forwarding the first and second digital scan data together with data for the azimuth angle to the computer system 2102. The electronic signals may be transferred via a glass fibre cable from the signal processing circuitry 2126 to a rotary joint at the rotation system 2116, which is further connected to the computer system 2102 by cables.

The computer system 2102 may hold first processing circuitry for processing the received first digital scan data and azimuth data to provide first type radar plots of detected objects presented by the signals received by the first antenna module, and further hold second processing circuitry for processing the received second digital scan data and azimuth data to provide second type radar plots of detected objects presented by the signals received by the second antenna module. The computer system 2102 may also hold radar track processing circuitry configured to provide a radar track for a detected object based on both first and second type radar plots. The computer system 2102 may also hold classifying circuitry for classifying the objects of the tracks.

The scanning radar system 2101 of FIG. 2a is based on two antenna modules 2110a, 2110b, where each antenna module comprises a first planar slotted waveguide antenna array 2111a, 2111b configured for radiating electromagnetic waves 2113a, 2113b, and a second planar slotted waveguide antenna array 2112a, 2112b configured for receiving electromagnetic waves 2114b.

Figure 3A:
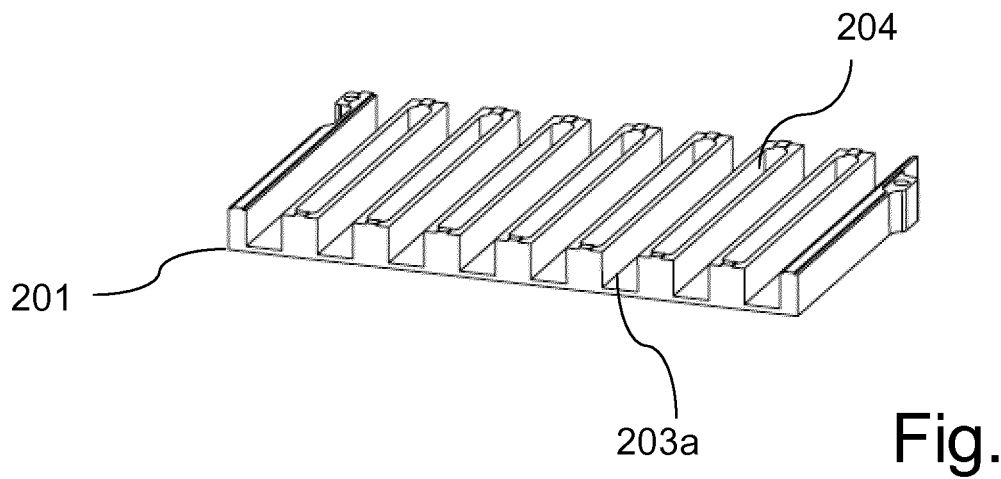
FIGS. 3a, b, c illustrates manufacturing of an array of slotted cavity columns for use in a planar cavity slotted-waveguide antenna array according to an example embodiment, with FIG. 3a illustrating manufacturing of a first one-piece metal element, and FIGS. 3b and 3c illustrating manufacturing of a second one-piece metal.
Figure 3B:
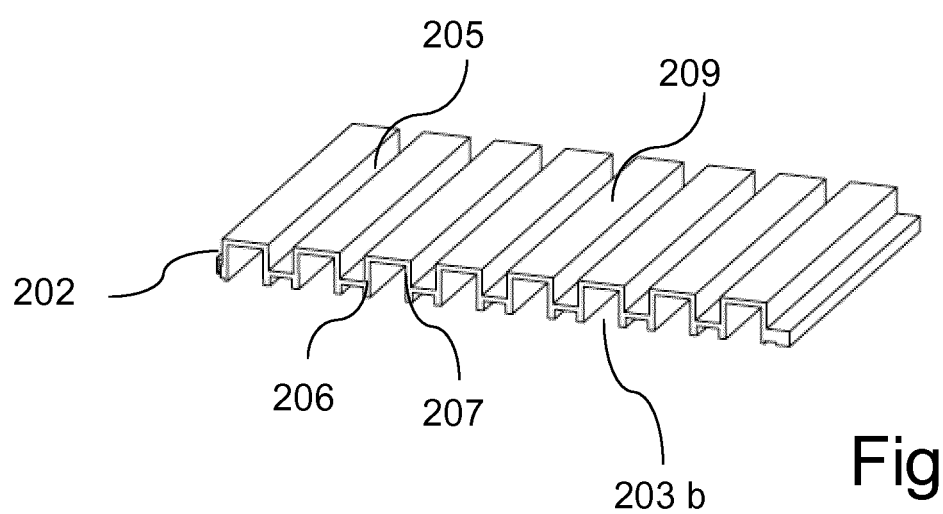
Figure 3C:
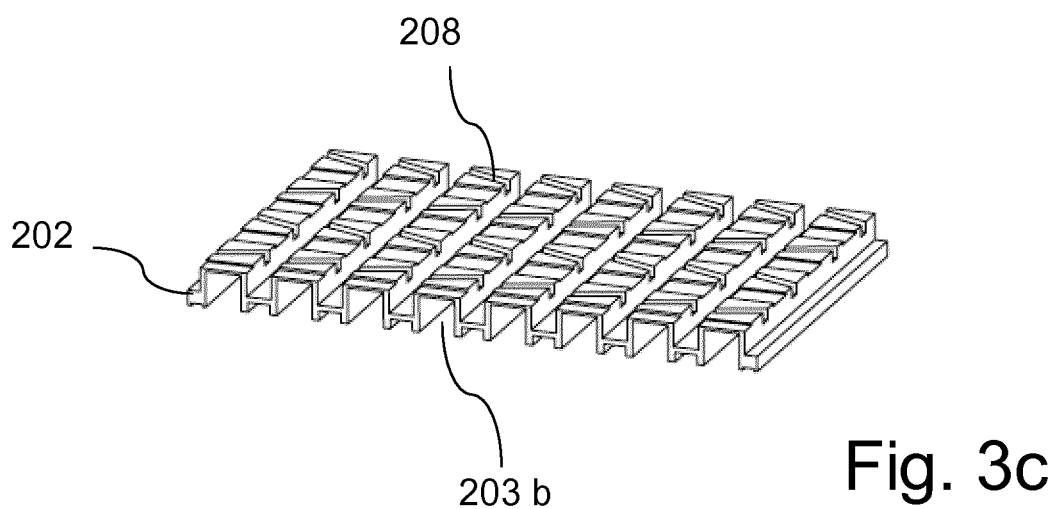

FIGS. 3a, b, c illustrates manufacturing of an array of slotted cavity columns for use in a planar cavity slotted-waveguide antenna array according to an example embodiment, with FIG. 3a illustrating manufacturing of a first one-piece metal element, and FIGS. 3b and 3c illustrating manufacturing of a second one-piece metal.

Figure 4:
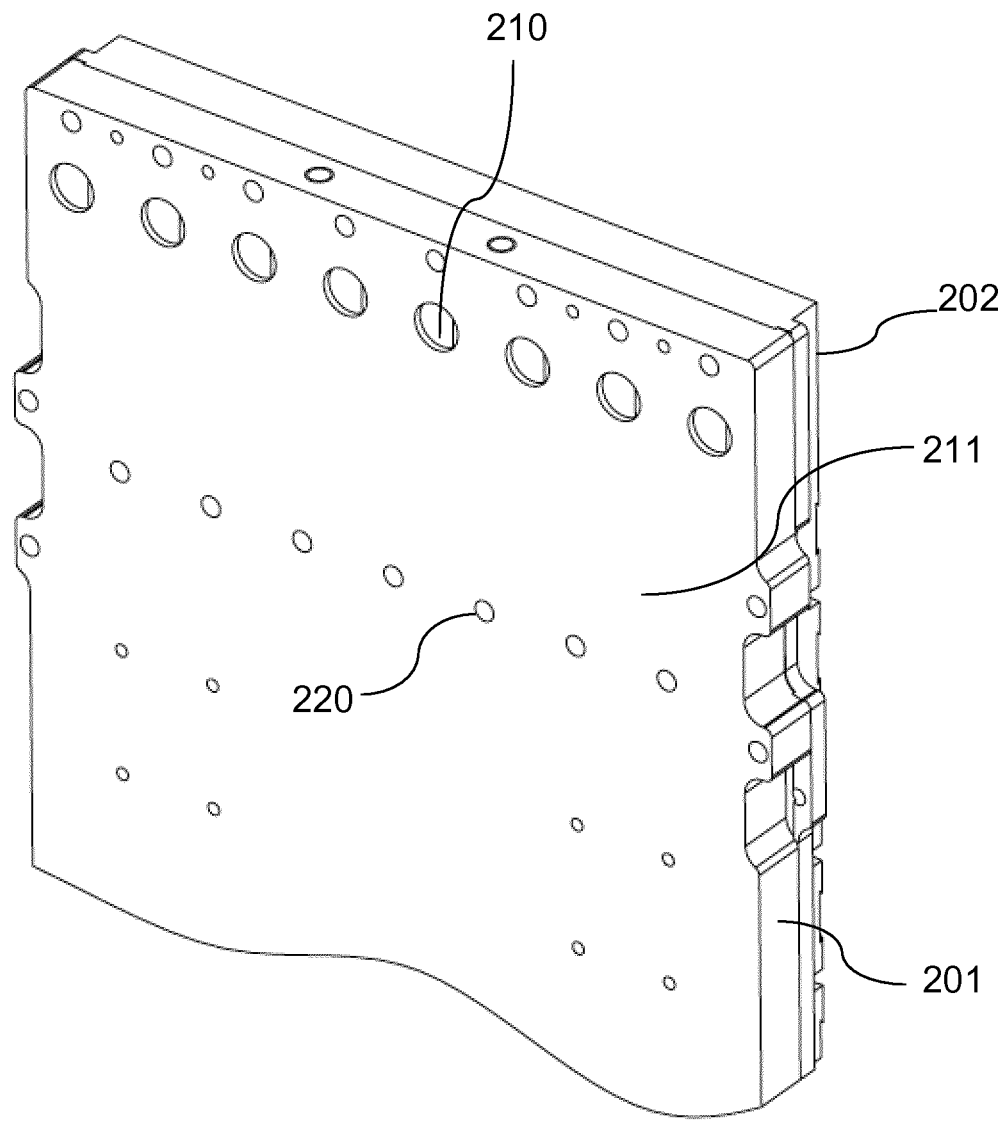
FIG. 4 is a bottom view illustrating further manufacturing steps of a cavity slotted-waveguide antenna array according to an example embodiment.

FIG. 4 is a bottom view illustrating further manufacturing steps of a cavity slotted-waveguide antenna array according to an example embodiment.

FIG. 3a illustrates manufacturing of a first one-piece metal element 201, which is a first single flat piece of metal, where a plurality of longitudinally extending parallel and equidistantly arranged open rear column portions 203a of equal dimensions are formed in the first flat piece of metal 201. In order to save weight of the final array, grooves 204 may be formed in the metal material left between the rear column portions 203a.

FIGS. 3b and 3c illustrate manufacturing of a second one-piece metal element 202, which is a second single flat piece of metal, where a plurality of longitudinally extending parallel and equidistantly arranged open front column portions 203b of equal dimensions are formed in the second flat piece of metal 202. The front column portions 203b have a width and a length equal to the width and length of the rear column portions 203a, and the front column portions 203b are arranged with a spacing equal to the spacing of the rear column portions 203a. After formation of the front column portions 203b, a plurality of longitudinally extending parallel front recesses 205 are formed in the second metal element 202. These front recesses 205 extend into the second metal element 202 from the front surface of the element 202, and the front recesses 205 define first and second sidewalls 206, 207 of a front part of the front column portions 203b. After the formation of the front recesses 205, a plurality of slots 208 are formed in the front column portions 203b. Each slot 208 extends from the bottom of the corresponding front column portion 203b to a front surface 209 of the second metal element 202.

A signal probe hole 210 is formed at the bottom of the rear column portions 203a, where each probe hole extends from the bottom of the corresponding rear column portion 203a to a rear surface 211 of the first metal element 201. When the slots 208 and probe holes 210 have been formed, the first and the second metal elements 201 and 202 are connected together with the openings of the rear column portions 203a facing the openings of the front column portions 203b. The connection of the first and second metal elements 201 and 202 forms a housing, which comprises a number of parallel slotted-waveguide columns 203 having a rectangular cross-section, see FIG. 5, where the parallel slotted-waveguide columns 203 are formed by the rear and front column portions 203a, 203b. The arrangement of the probe holes 210 at the rear surface 211 of the first metal element 201 is illustrated in FIG. 4, which also shows the first and second metal elements 201 and 202 being connected together. The diameter of the probe hole 210 may equal the internal width of the columns 203 or rear column portions 203a. In FIG. 4 is also shown screw holes 220, which are provided at the rear surface 211 of the first metal element 201 in between the rear column portions 203a. The screw holes 220 may hold screws connecting the first and second metal elements 201 and 202.

The material used for the metal elements 201 and 202 may be anodized aluminum. Is it preferred that the formation of the rear column portions 203a and grooves 204 in the first metal element 201, the formation of the front column portions 203b, the front recesses 205, and the slots 208 in the second metal element 202 are performed by use of milling. The probe holes 210 may also be formed in the first metal element 201 by drilling.

Figure 5:
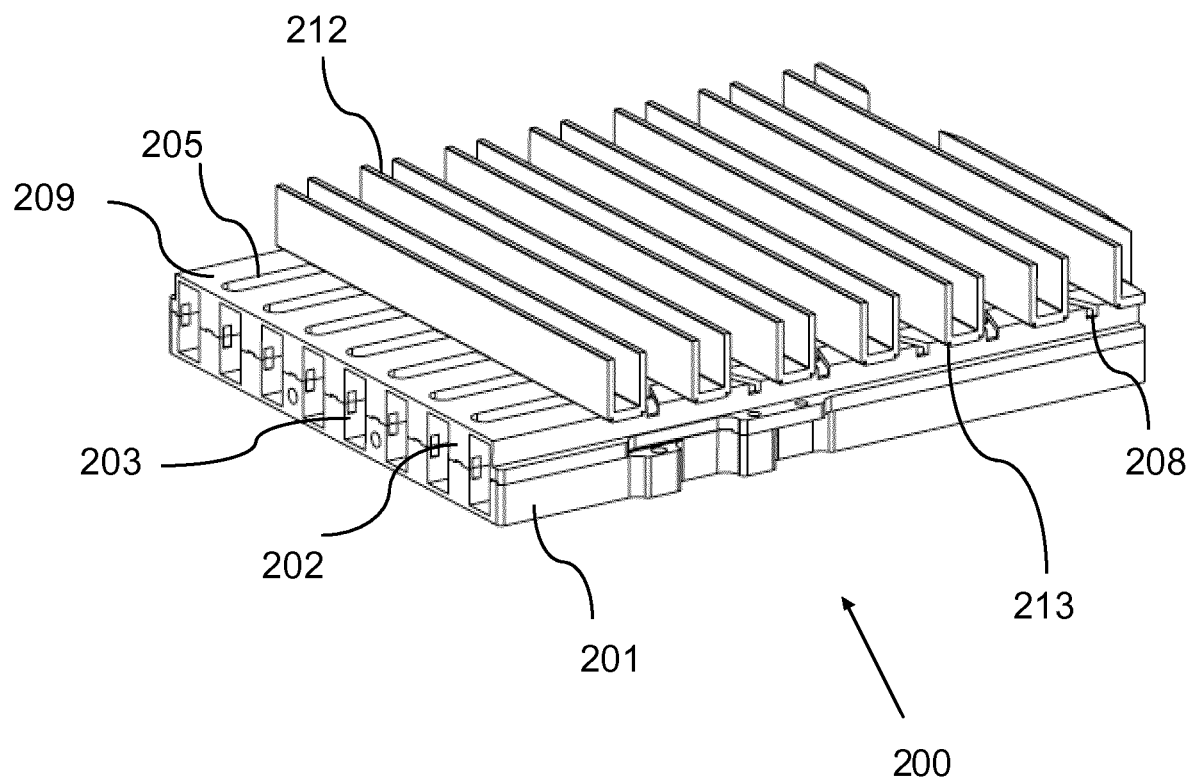
FIG. 5 shows a cavity slotted-waveguide antenna array holding plate blinds according to an example embodiment.

FIG. 5 shows part of a cavity slotted-waveguide antenna array 200, which has been manufactured and assembled as described above in connection with FIGS. 3a,b,c and FIG. 4. According to an example embodiment, the array 200 is further provided with a number of conductive parallel plate blinds 212, which are conductively secured to the front side or surface 209 of the housing holding the waveguide columns 203b, 203, where the front side or surface 209 holds the cavity slots 208. The plate blinds 212 are arranged substantially perpendicular to the longitudinal direction of the waveguide columns 203. The plate blinds 212 have two parallel outer surfaces being first and second parallel outer surfaces, and the blinds 212 are substantially U-shaped with two parallel side plates and a bottom plate. The plate blinds 212 are secured to the front side or surface 209 of the housing holding the waveguide columns 203b, 203 by a sliding dovetail joint 213. The tail of a dovetail joint is formed at a bottom part of a U-shaped plate blind 212 and the socket of the dovetail joint is formed in the front side or surface 209 of the housing holding the outermost positioned waveguide columns 203b, 203. The waveguide columns 203 with no dovetail socket in the front surface 209 may hold a cut-out corresponding to the width of the bottom of the plate blinds. The use of dovetail joints and cut-outs serves to increase the mechanical stabilization of the arrays, and to keep the waveguide columns in alignment. The use of plate blinds 212 is optional.

Figure 6A:
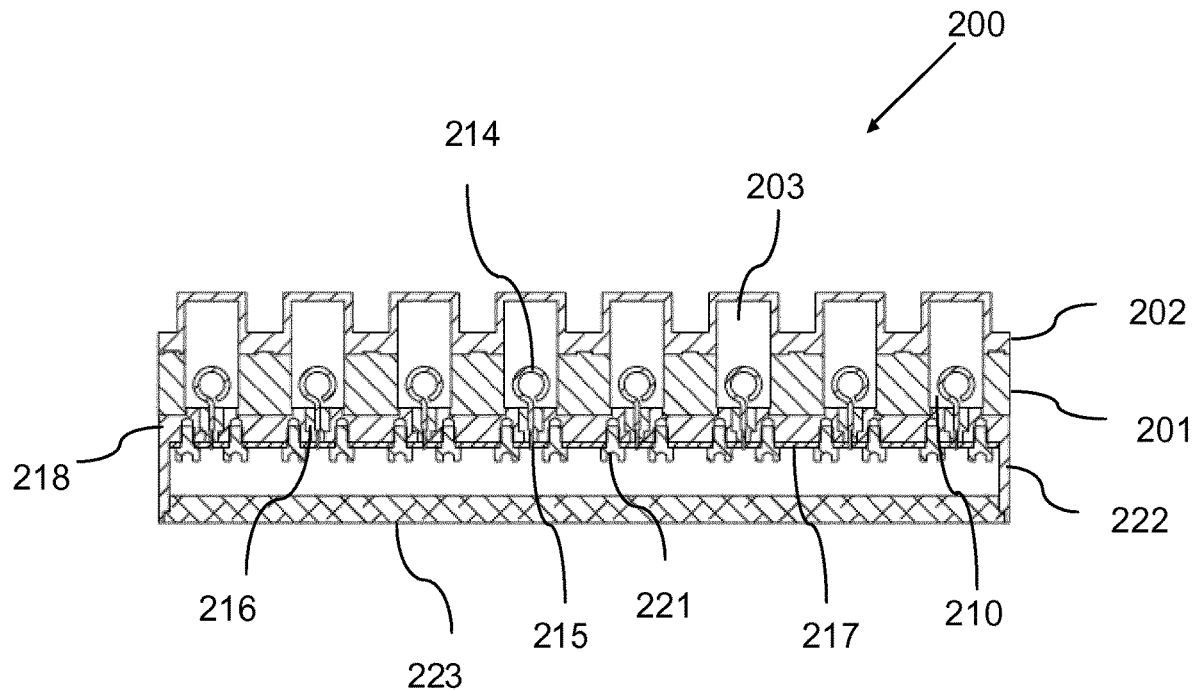
FIGS. 6a and 6b show a cut through end view and an enlarged cut out view of a cavity slotted-waveguide antenna array with signal probes inserted according to an example embodiment.
Figure 6B:
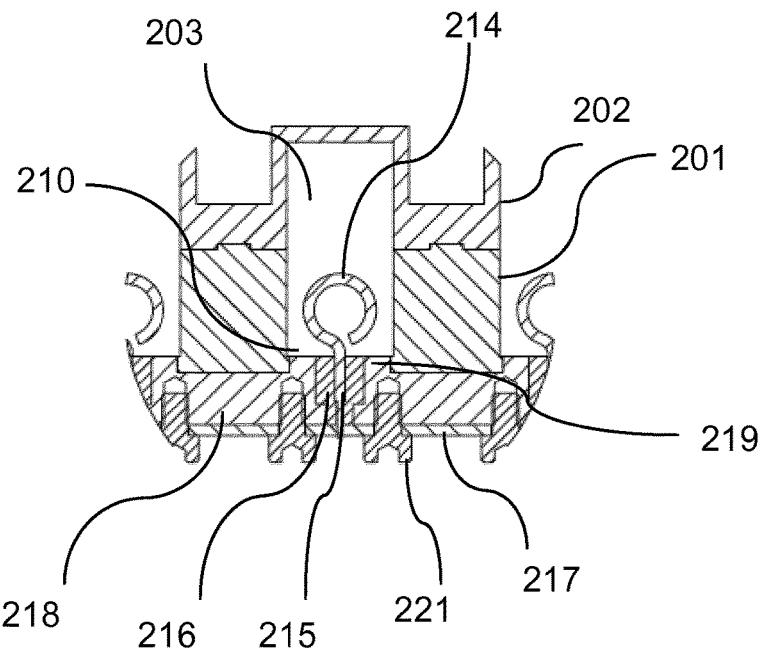

In order for the slotted-waveguide columns 203 to emit or receive an electromagnetic signal, a signal probe may be inserted in the probe hole 210. This is illustrated in FIGS. 6a and 6b, which show a cut through end view and an enlarged cut out view of a cavity slotted-waveguide antenna array 200 with signal probes 214 inserted in each waveguide column 203, according to an example embodiment.

The array 200 has eight waveguide columns 203 disposed in a predetermined adjacent position with respect to one another, where each column may be formed by a rear column portion 203a formed in a first one-piece metal element 201 and by a front column portion 203b formed in a second one-piece metal element 202. Each column 203 has a number of slots 208 formed in the front column portion 203b, see FIG. 3c, and each column 203 has an upper and a lower end. The waveguide columns 203 have a rectangular cross-section, and the waveguide columns 203 are defined by two wide inner surfaces being first and second wide inner surfaces, a narrow inner back surface, and narrow inner front surface. The narrow inner front surface and the front side 209 of the housing define a narrow front wall holding the cavity slots 208. The slots 208 are narrow walled slots or transverse narrow walled slots 208, which reach from the first inner wide surface to the second wide inner surface.

A signal probe 214 is operably disposed in each column 203 for emitting and/or receiving an electromagnetic signal. The electromagnetic signal may have a free-space wavelength of $\lambda_0$, and the signal propagates within the column 203 holding the signal probe 214 as electromagnetic waves with a corresponding guided signal wavelength $\lambda_g$. For the embodiment illustrated in FIG. 6, the signal probes 214 are open ended loop probes with an open ended loop disposed at the narrow inner back surface opposite and facing the narrow inner front surface of the waveguide column 203 holding the loop probe 214.

The open ended loop of the loop probe 214 is arranged in a direction perpendicular to the longitudinal direction of the waveguide column 203, and the open ended loop probe 214 may be disposed proximal to the lower end of the column 203 holding the probe 214. According to an embodiment, each column 203 has an absorbing load at its upper end while the lower end of the waveguide column may be terminated with a short circuiting end geometry (blind end) or an absorbing load, to enable the column 203 to function in a travelling wave mode.

The signal probes 214 are formed of an electrically conductive material, such as copper or silver-plated copper, and are electrically non-conductively secured to the columns 203. The open ended loop of a loop probe 214 forms part of a loop circle, which may have a circumference in the range of ⅓ to ⅔, such as about ½ of the guided signal wavelength $\lambda_g$.

The housing holding the waveguide columns 203 has a rear side surface, and a waveguide bottom wall is defined by the narrow inner back surface of a waveguide column 203 and the rear side surface of the housing, whereby an outer back surface of the waveguide bottom wall is defined by the rear side of the housing. The open ended loop probes 214 have a probe connection part 215 opposite the open ended loop, where the probe connection part 215 extends through probe holes 210 provided at the waveguide bottom wall. An enclosure part 218 is disposed between a printed circuit board, PCB, 217 and the outer back surface of the waveguide bottom wall, and the loop probe connection part 215 extends through a surrounding part 219 formed by the enclosure part 218 to reach the printed circuit board 217. An end part of the connection part 215 of each of the loop probes 214, which may reach through the PCB 217 by a so-called via, is electrically connected to a corresponding electrical conductive signal trace provided at the front surface of the printed circuit board 217. The surrounding parts 219 of the enclosure part 218 may be formed to fit or fill out the probe holes 210, and the probe holes 210 may have a diameter equal to the internal width of the column 203. An electrically non-conductive material 216 surrounds the probe connection part 215 extending through the enclosure part 218. The electrical non-conductive material may comprise or is made of Polyether Ether Ketone, PEEK, plastic. The enclosure part 218 holds sidewalls 222, and a lid 223 is secured to the sidewalls to close off the enclosure part 218.

The enclosure part 218 is made of an electrical conductive material, such as aluminium. Before securing the enclosure part 218 to the rear side of the array housing holding the waveguide columns, the probes 214 and the PCB 217 may be connected to the enclosure part 218. First, each loop probe 214 is connected to the enclosure part 218 by having the connection part 215 surrounded by the non-conductive material 216 and arranged within the surrounding part 219 of the enclosure part 218. The printed circuit board, PCB, 217 can then be secured to the enclosure part 218 by screws 221 with the end part of the probe connection part 215 reaching through the PCB 217 by the so-called via. The end part of the probe connection part 215 can now be soldered or electrical connected to a corresponding electrical conductive signal trace provided at the front surface of the printed circuit board 217. The PCB 217 has a bottom surface facing the enclosure part 218, where the PCB bottom surface holds electrical conductive ground traces or parts to provide an electrical ground connection to the enclosure part 218. In an embodiment, the enclosure part 218 is silver plated for maintaining an electrical connection between the enclosure part 218 and the PCB bottom ground traces.

Each PCB signal trace corresponding to a loop probe 214 may have a first trace end soldered to the end part 215 of the loop probe 214, and each of these PCB signal traces is a copper trace, which preferably is formed to obtain a characteristic impedance of 50 Ohm. The PCB signal traces having one end electrically corresponding to a loop probe 214, may in the other end be electrically connected to radio frequency transmit circuitry, when the array is a transmitting array, or connected to receive circuitry, when the array is a receiving array, where the transmit or receive circuitry may be arranged at the front surface of the PCB 217. The radio frequency transmit circuitry may comprise a radio frequency amplifier, and the receive circuitry may comprise a pseudomorphic high electron mobility transistor, PHEMT.

Figure 7A:
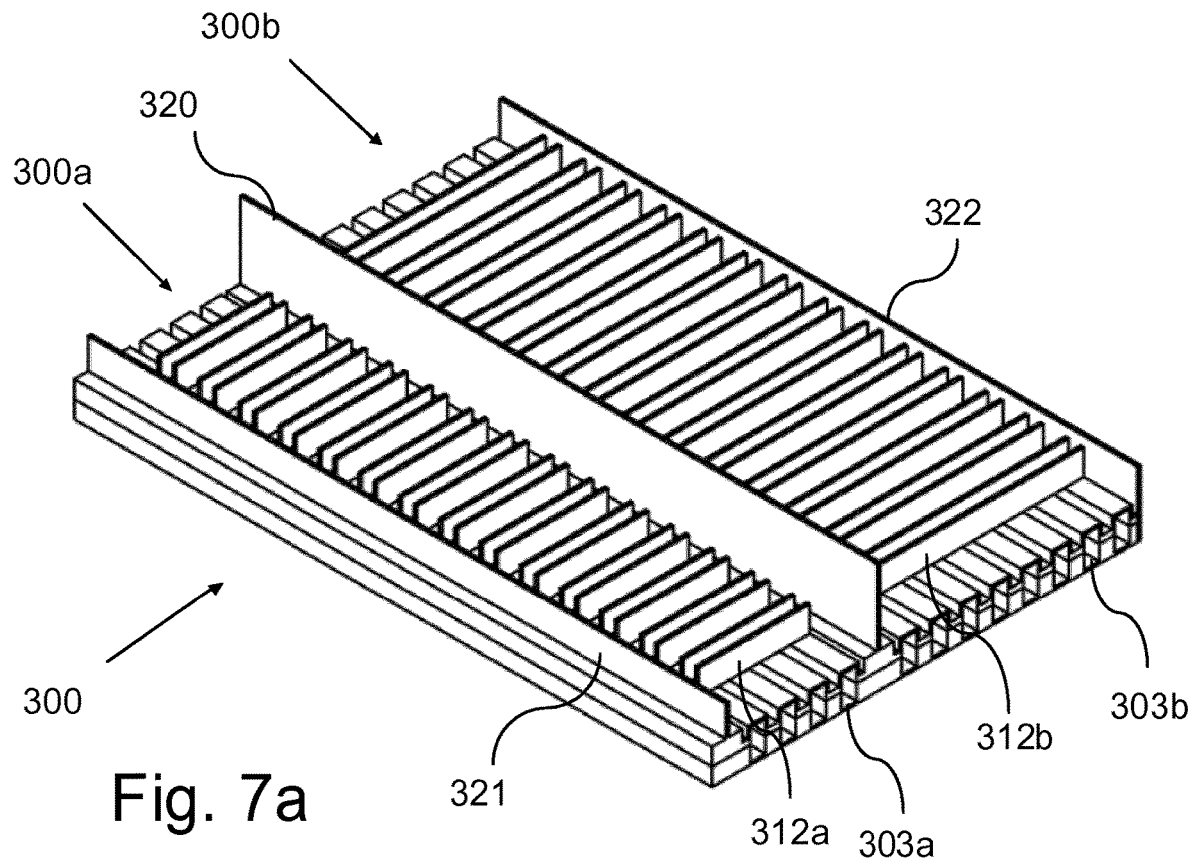
FIGS. 7a and 7b are perspective and side views, respectively, of a cavity slotted waveguide antenna array holding both a radiating array and a receiving array with absorber shields according to an example embodiment.
Figure 7B:
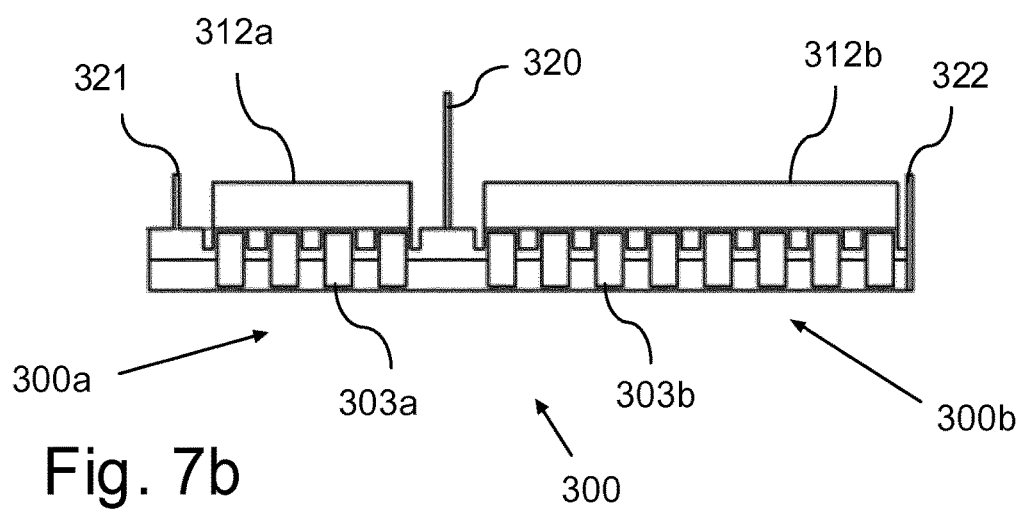

FIGS. 7a and 7b are perspective and side views, respectively, showing a cavity slotted waveguide antenna array 300 holding both a first radiating array 300a and a second receiving array 300b according to an example embodiment. The radiating array 300a and the receiving array 300b may be manufactured and assembled as described above in connection with FIGS. 3 to 6. Each of the antenna modules 110a and 110b of the system 101 of FIG. 1a may hold an antenna array equal to the array 300 of FIGS. 7a and 7b.

For the array 300 of FIGS. 7a and 7b, the waveguide columns within the first radiating array 300a and second receiving array have equal dimensions. The first radiating array 300a comprises four waveguide columns 303a, and the second receiving array 300b comprises eight waveguide columns 303b. Thus, both antenna modules 110a and 110b may have equal dimensioned waveguide columns 303a, 303b, whereby it is possible to operate within the same frequency band for both antenna modules.

For the array 300, the front side of the columns 303a, 303b holding the cavity slots 208, see FIG. 3c, of both the first and second antenna arrays 300a, 300b are positioned substantially in the same plane. By having the radiating and receiving arrays in the same plane, a simplified manufacture of the antenna module may be obtained. The waveguide columns 303a, 303b of the first and second antenna arrays 300a, 300b are of equal length, and first ends of the waveguide columns 303a, 303b of both the first and second antenna arrays 300a, 300b are aligned in a direction perpendicular to the longitudinal direction of the waveguide columns 303a, 303b, and opposite second ends of the waveguide columns 303a, 303b of both the first and second antenna arrays 300a, 300b are also aligned in a direction perpendicular to the longitudinal direction of the waveguide columns 303a, 303b.

The first radiating antenna array 300a holds a number of parallel plate blinds 312a secured to the front side of the first antenna array 300a besides or between the cavity slots and substantially perpendicular to the longitudinal direction of the waveguide columns 303a of the first antenna array, and the second receiving antenna array 300b holds a number of parallel plate blinds 312b secured to the front side of the second antenna array 300b besides or between the cavity slots and substantially perpendicular to the longitudinal direction of the waveguide columns 303b of the second antenna array. The plate blinds 312a, 312b are vertical blinds or baffles for reducing electromagnetic power radiated in the cross-polarization, that is blinds or baffles for cross-polarization suppression. The plate blinds 312a, 312b may be substantially U-shaped with two parallel side plates and a bottom plate.

A radiating signal probe, not shown in FIGS. 7a and 7b, see the probe 214 of FIGS. 6a and 6b, is operably disposed proximal to a first end in each column 303a of the first antenna array 300a, and a receiving signal probe 214 is operably disposed proximal to a first end in each column 303b of the second antenna array 300b. The waveguide columns 303a, 303b of both the first and second antenna arrays 300a, 300b hold an absorbing load within the second column end. By having aligned waveguide columns of equal length provided with absorbing loads, the antenna arrays may function in the travelling wave mode.

For the array 300, an electromagnetic shield or shield plate 320 is arranged substantially parallel to the waveguide columns 303a, 303b and between the first lower radiating antenna array 300a and the second upper receiving antenna array 300b, where the shield or shield plate 320 extends outwards from the front side of the antenna array 300. The electromagnetic shield or shield plate 320 may be an electromagnetic absorbing shield or shield plate, which may be fully or at least partly covered by an electromagnetic absorbing material. The array 300 also holds a lower electromagnetic shield or shield plate 321, which may be an electromagnetic absorbing shield or shield plate, and which may be fully or at least partly covered by an electromagnetic absorbing material, and which is arranged substantially parallel to the waveguide columns 303a and below the lowermost waveguide column 303a of the first lower radiating antenna array 300a. The lower electromagnetic shield or shield plate 321 extends outwards from the front side of the antenna array 300. The array 300 further holds an upper electromagnetic shield or shield plate 322, which may be an electromagnetic absorbing shield or shield plate, and which may be fully or at least partly covered by an electromagnetic absorbing material, and which is arranged substantially parallel to the waveguide columns 303b and above the uppermost waveguide column 303b of the second upper receiving antenna array 300b. The upper electromagnetic shield or shield plate 322 extends outwards from the front side of the antenna array 300. The height of the upper and lower electromagnetic shields 322 and 321 should be at least equal to the height of the plate blinds 312a, 321b. The height of the electromagnetic shield or shield plate 320 between the first lower radiating antenna array 300a and the second upper receiving antenna array 300b should also be at least equal to the height of the plate blinds 312a, 321b, and preferably the height of the shield 320 is higher than the height of the upper and lower absorbers shields 322 and 321.

The electromagnetic absorber shield or electromagnetic absorbing material may comprise a carbon loaded foam material, such as a carbon loaded foam tape. The electromagnetic absorber shield or electromagnetic absorbing material may have a thickness in the range of 4-12 mm, such as in the range of 5-10 mm, such as in the range of 5-8 mm, such as about 6 mm.

By having the electromagnetic shield or shield plate 320 between the radiating array 300a and the receiving array 300b, and by having the lower and upper electromagnetic shields or shield plates 321 and 322, the internal reflection of electromagnetic signals between and alongside the vertical plate blinds 312a, 312b is reduced.

In an embodiment, part of the dimensions of the array 300 are as follows: the total length of the array 300 and the columns 303a, 303b is 420 mm; the total width of the array 300 is 282 mm; the length of the plate blinds 312a covering the four columns 303a of the radiating array 300a is 73 mm; the length of the plate blinds 312b covering the eight columns 303b of the receiving array 300b is 153 mm; distance between closest side walls of neighboring plate blinds 412 is 14.5 mm; height of the electromagnetic shield or shield plate 320 when measured from the top or front side of the array 300 is 50 mm; height of the lower electromagnetic shield or shield plate 321 when measured from the top or front side of the array 300a is 20 mm; height of the upper electromagnetic shield or shield plate 322 when measured from the top or front side of the array 300b is 20 mm.

Figure 8:
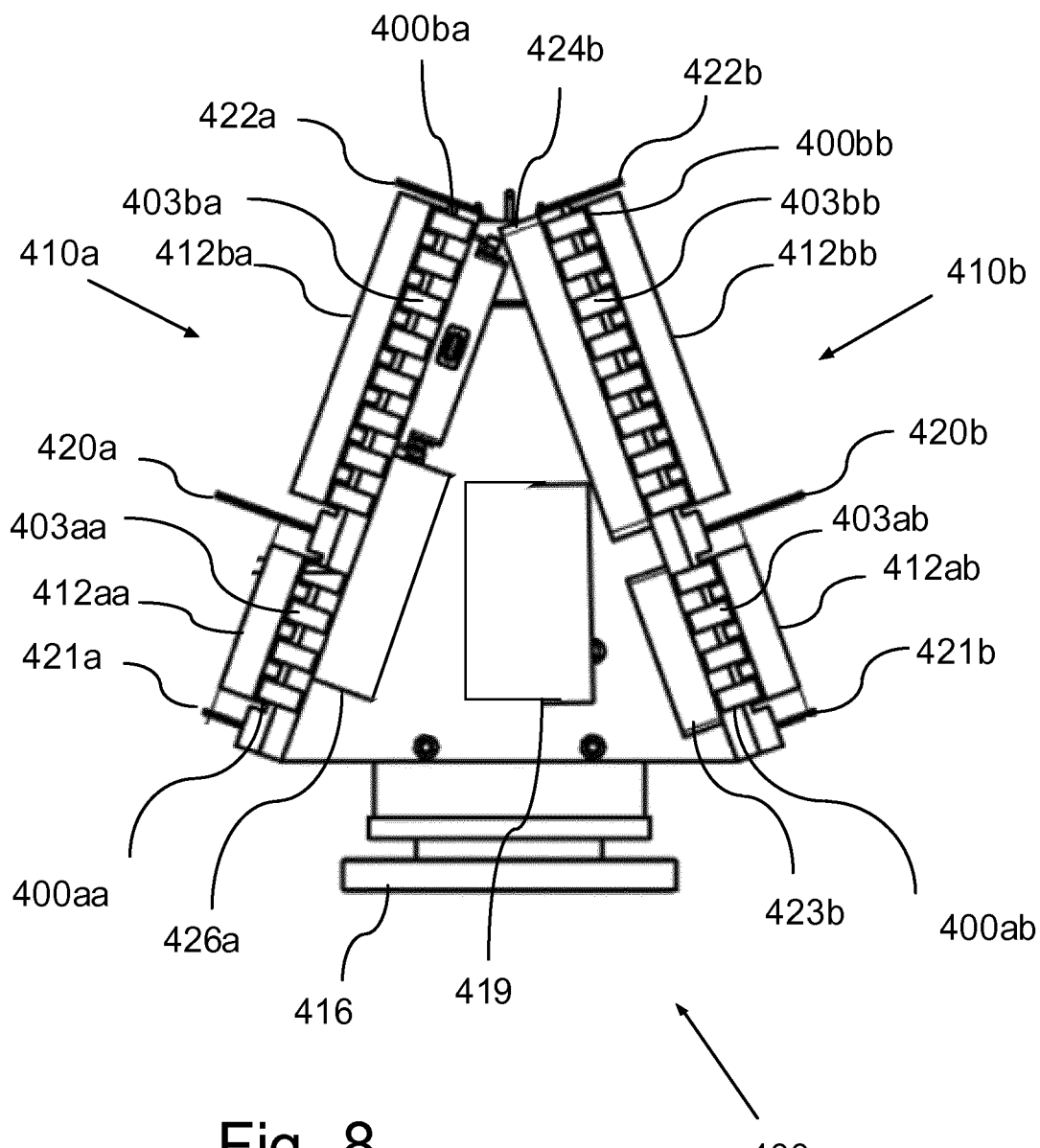
FIG. 8 is a side view illustrating a back-to-back arrangement of two antenna modules each holding an antenna array as illustrated in in FIGS. 7a and 7b, according to an example embodiment.

FIG. 8 is a side view illustrating a back-to-back to arrangement 400 of two antenna modules 410a and 410b each holding an antenna array similar to the array 300 as illustrated in in FIGS. 7a and 7b, according to an example embodiment. The first antenna module 410a holds a first and lower radiating array 400aa with four waveguide columns 403aa and a second higher receiving array 400ba with eight waveguide columns 403ba. Both the first and second arrays 400aa and 400ba holds plate blinds 412aa and 412ba, respectively, arranged perpendicular to the longitudinal direction of the waveguide columns 403aa, 403ba.

An electromagnetic shield or shield plate 420a is arranged substantially parallel to the waveguide columns 403aa, 403ba and between the first lower radiating antenna array 400aa and the second upper receiving antenna array 400ba. A lower electromagnetic shield or shield plate 421a is arranged substantially parallel to the waveguide columns 403aa and below the lowermost waveguide column 403aa of the first lower radiating antenna array 400aa. An upper electromagnetic shield or shield plate 422a is arranged substantially parallel to the waveguide columns 403ba and above the uppermost waveguide column 403ba of the second upper receiving antenna array 400ba.

Similar to the first antenna module 410a, the second antenna module 410b holds a first and lower radiating array 400*ab* with four waveguide columns 403*ab* and a second higher receiving array 400*bb* with eight waveguide columns 403*bb*. Both the first and second arrays 400*ab* and 400*bb* holds plate blinds 412*ab* and 412*bb*, respectively, arranged perpendicular to the longitudinal direction of the waveguide columns 403*ab*, 403*bb*.

An electromagnetic shield or shield plate 420*b* is arranged substantially parallel to the waveguide columns 403*ab*, 403*bb* and between the first lower radiating antenna array 400*ab* and the second upper receiving antenna array 400*bb*. A lower electromagnetic shield or shield plate 421*b* is arranged substantially parallel to the waveguide columns 403*ab* and below the lowermost waveguide column 403*ab* of the first lower radiating antenna array 400*ab*. An upper electromagnetic shield or shield plate 422*b* is arranged substantially parallel to the waveguide columns 403*bb* and above the uppermost waveguide column 403*bb* of the second upper receiving antenna array 400*bb*.

The first antenna module 410*a* also holds on-board circuitry including signal processing circuitry 426*a* and electronic transmit circuitry 423*a*, not shown in FIG. 8, and electronic receive circuitry 424*a*, not shown in FIG. 8. The second antenna module 410*b* also holds on-board circuitry including signal generating system 425, not shown in FIG. 8, and electronic transmit circuitry 423*b*, and electronic receive circuitry 424*b*. The arrangement 400 is supported by a rotation system 416 and holds a motor controller 419 for controlling the rotation system 416.

For the arrangement 400 of FIG. 8, the first and second antenna modules 410*a* and 410*b* are arranged in a mirrored position relative to a plane intersecting the vertical axis of rotation, see axis 115 of FIG. 1. The cavity slots on the front side of the columns 403*aa* and 403*ba* of the first and second antenna arrays 400*aa* and 400*ba* of the first antenna module 410*a* are arranged in a partially upwards facing plane having a first acute angle to the vertical direction. Also, the cavity slots on the front side of the columns 403*ab* and 403*bb* of the first and second antenna arrays 400*ab* and 400*bb* of the second antenna module 401*b* are arranged in a partially upwards facing plane having a second acute angle to the vertical direction. When the antenna modules 410*a* and 410*b* are in the mirrored position, the first acute angle is substantial equal to the second acute angle. It is preferred that the first and second acute angles are in the range of 10-30°, such as about 20°.

Figure 9:
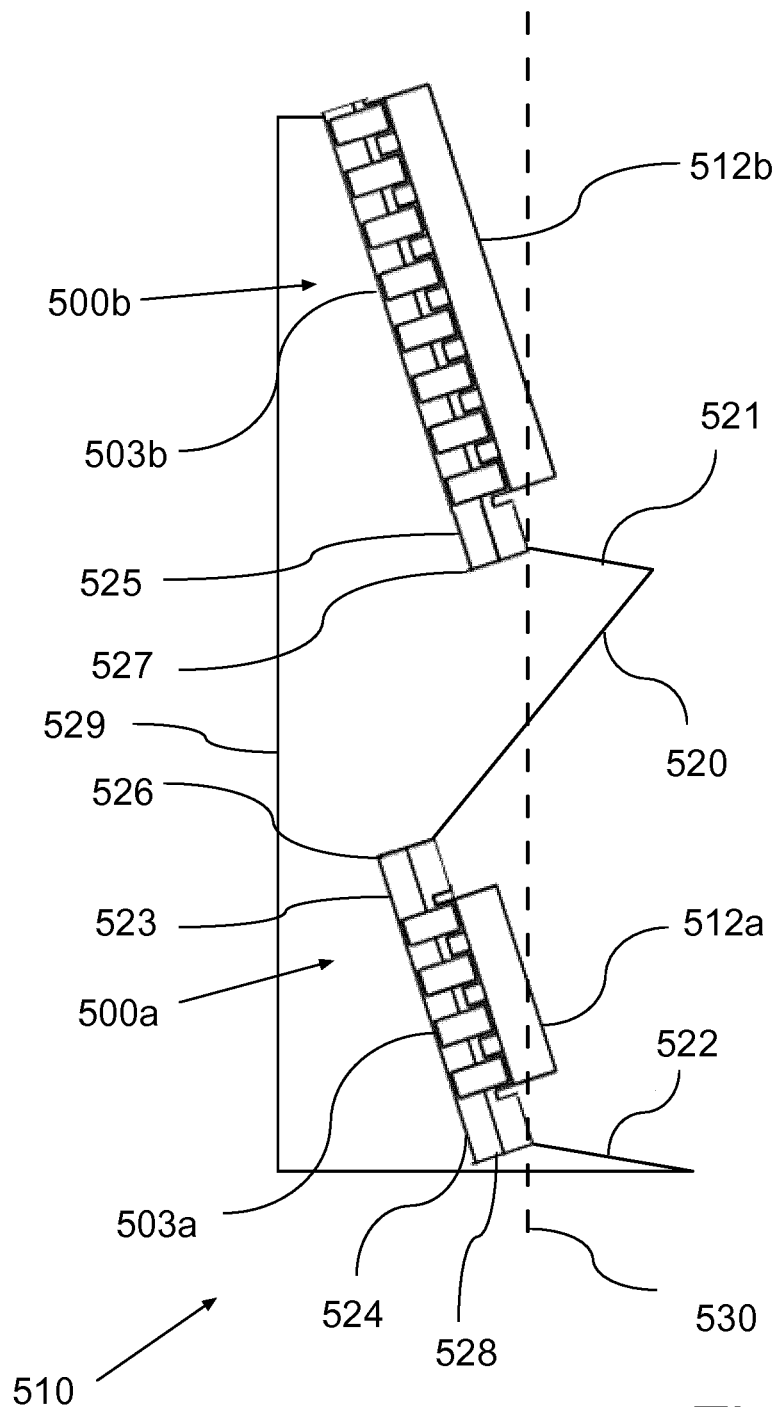
FIG. 9 is a side view of a radar antenna module holding a radiating array and a receiving array with electromagnetic shields according to an example embodiment.

FIG. 9 is a side view of a radar antenna module 510 holding a first radiating array 500*a* and a second receiving array 500*b* with electromagnetic shields 520, 521, 522 according to an example embodiment.

The radiating array 500*a* and the receiving array 500*b* may be manufactured and assembled as described above in connection with FIGS. 3 to 6. Each of the antenna modules 2110*a* and 2110*b* of the system 2101 of FIG. 2*a* may hold a radiating and a receiving antenna array 500*a*, 500*b* equal to the arrays 500*a* and 500*b* of the module 510 of FIG. 9.

For the module 510 of FIG. 9, the waveguide columns 503*a* and 503*b* within the first radiating array 500*a* and second receiving array 503*b* have equal dimensions. The first radiating array 500*a* comprises four waveguide columns 503*a*, and the second receiving array 500*b* comprises eight waveguide columns 503*b*. Thus, both antenna modules 2110*a* and 2110*b* may have equal dimensioned waveguide columns 503*a*, 503*b*, whereby it is possible to operate within the same frequency band for both antenna modules.

For the module 510, the radiating array 500*a* is positioned at a distance to the receiving array 500*b*. The radiating array 500*a* has a front side positioned in a first plane, and the receiving array 500*b* has a front side positioned in a second plane, which second plane is parallel to the first plane. Thus, the front sides of the first radiating array 500*a* and the second receiving arrays 500*b* face the same direction being a front direction of the antenna module 510. When the first and second planes are parallel to each other, the resulting distance between the radiating array 500*a* and the receiving array 500*b* holds a distance component in a direction parallel to the first and second planes, and a distance component in a direction perpendicular to the first and second planes. The first plane is offset from the second plane by said perpendicular distance component in a direction opposite to the front direction of the module 510. This perpendicular distance component is in the following referred to as perpendicular array distance.

By having the radiating array 500*a* and the receiving array 500*b* offset to each other in the direction perpendicular to the first and second planes, the resulting module 510 may take up less space in the horizontal direction when the module 510 is used in a rotating antenna system such as the system 2101 of FIG. 2*a*. It is preferred that the first and second parallel planes are offset with a minimum perpendicular array distance, where the minimum perpendicular array distance is at least 3 times or at least 5 times the internal width of the waveguide columns 503*a*, 503*b*.

The first radiating antenna array 500*a* and the second receiving antenna array 500*b* are positioned at a distance to each other with a longitudinal extending outer sidewall of an outermost waveguide column of the first array 500*a* positioned closest to a longitudinal extending outer sidewall of an outermost waveguide column of the second array 500*b*. Here, the closest outer sidewalls of these outermost columns of the first and second antenna arrays 500*a*, 500*b* may be positioned with a minimum parallel column distance to each other in a direction parallel to the first and second planes. It is preferred that this minimum parallel column distance is at least 5 times the internal width of the waveguide columns 503*a*, 503*b*. It is also within embodiments that this minimum parallel column distance is at least 10 times, such as at least 12 times or at least 15 times the internal width of the waveguide columns.

By having the radiating array 500*a* and the receiving array 500*b* offset to each other in a direction parallel to the first and second planes, the amount of false reflections from the radiating antenna reaching the receiving antenna will be reduced, thereby improving the signal to noise ratio.

The module 510 may also hold a support 529 in order to hold the first and second antenna arrays 500*a* and 500*b* in the desired position.

The waveguide columns 503*a*, 503*b* of the first and second antenna arrays 500*a*, 500*b* are of equal length, and first ends of the waveguide columns 503*a*, 503*b* of both the first and second antenna arrays 500*a*, 500*b* may reach a single plane in a direction perpendicular to the longitudinal direction of the waveguide columns 503*a*, 503*b*, and opposite second ends of the waveguide columns 503*a*, 503*b* of both the first and second antenna arrays 500*a*, 500*b* may reach another single plane in a direction perpendicular to the longitudinal direction of the waveguide columns 503*a*, 503*b*.

The first radiating antenna array 500*a* may hold a number of parallel plate blinds 512*a* secured to the front side of the first antenna array 500*a* besides or between the cavity slots and substantially perpendicular to the longitudinal direction of the waveguide columns 503*a* of the first antenna array, and the second receiving antenna array 500*b* may hold a number of parallel plate blinds 512*b* secured to the front side of the second antenna array 500b besides or between the cavity slots and substantially perpendicular to the longitudinal direction of the waveguide columns 503b of the second antenna array. The plate blinds 512a, 512b are vertical blinds or baffles for reducing electromagnetic power radiated in the cross-polarization, that is blinds or baffles for cross-polarization suppression. The plate blinds 512a, 512b may be substantially U-shaped with two parallel side plates and a bottom plate.

A radiating signal probe, not shown in FIG. 9, see the probe 214 of FIGS. 6a and 6b, is operably disposed proximal to a first end in each column 503a of the first antenna array 500a, and a receiving signal probe 214 is operably disposed proximal to a first end in each column 503b of the second antenna array 500b. The waveguide columns 503a, 503b of both the first and second antenna arrays 500a, 500b hold an absorbing load within the second column end. By having aligned waveguide columns of equal length provided with absorbing loads, the antenna arrays may function in the travelling wave mode.

For the module 510 of FIG. 9, the first antenna array 500a has a first longitudinal extending outermost array sidewall 526 closest to a second longitudinal extending outermost array sidewall 527 of the second antenna array 500b, where these closest array sidewalls 526 and 527 are positioned with a minimum parallel array distance to each other in a direction parallel to the first and second planes. The first antenna array 500a has spacer parts 523 and 524 connected to the outermost waveguide columns 503a, and the second antenna array 500b has a spacer part 525 connected to the outermost waveguide column 503b closest to the first antenna array 500a. The first array sidewall 526 is the sidewall of spacer part 523, the second array sidewall 527 is the sidewall of the lower spacer part 525 of the second antenna array 500b, while the lower spacer part 524 of the first antenna array has a third outermost array sidewall 528. A spacer part, not shown in FIG. 9, may also be provided at the upper side of the second antenna array 500b opposite the spacer part 525.

For the first and second antenna arrays 500a, 500b the spacer parts 523, 524 are positioned next to the outermost waveguide columns 503a, 503b, whereby the minimum parallel array distance is smaller than the minimum parallel column distance. However, it is also within an embodiment that the spacer parts 523 and 525 are omitted, whereby the outermost array sidewalls 526 and 527 are the outer sidewall of the outermost waveguide columns of the first antenna array 500a and the outer sidewall of the closest outermost waveguide of the second antenna array 500b, whereby the minimum parallel array distance may be equal to the minimum parallel column distance.

The first and second antenna arrays 500a, 500b may be positioned so that the upper edges of the outermost array sidewalls 527 and 528 reach a common vertical axis 530 as illustrated in FIG. 9, to thereby reduce the space used in the horizontal direction for the module 510.

For the module 510, a first electromagnetic shield plate 520 and a second electromagnetic shield plate 521 are positioned between the first radiating array 500a and the second receiving array 500b. The electromagnetic shield plates 520, 521 are dimensioned and positioned so that at least a part of the electromagnetic shield plates 520 and 521 extends outwards from the front side of the antenna module 510. Both the first shield plate 520 and the second shield plate 521 have a first direction of extension and a second direction of extension perpendicular to the first direction of extension, with the first direction of extension for both shield plates being parallel to the longitudinal extension of the waveguides 503a, 503b. The second direction of extension of the first shield plate 520 forms a first obtuse angle α1, see FIG. 13, to the front side of the first array 500a, and the second direction of extension of the second shield plate 521 forms a second obtuse angle α2, see FIG. 13, to the front side of the second array 500b. The first and second shield plates 520, 521 reach a point or line of contact along their second directions of extension, with second direction of extension of the first shield plate 520 forming a first acute angle α4, see FIG. 13, to the second direction of extension of the second shield plate 521.

A third electromagnetic shield plate 522 may also be positioned at a lower edge of the first radiating array 500a, opposite the first electromagnetic shield plate 520. The electromagnetic shield plate 522 is dimensioned and positioned so that at least a part of the electromagnetic shield plate 522 extends outwards from the front side of the first radiating array 500a. The third shield plate 522 also has a first direction of extension and a second direction of extension perpendicular to the first direction of extension, where the first direction of extension of the third shield plate 522 is parallel to the longitudinal extension of the waveguides 503a, and where the second direction of extension of the third shield plate 522 forms a third obtuse angle α3, see FIG. 13, to the front side of the first array 500a. The use of the third electromagnetic shield plate 522 is optional. A fourth electromagnetic shield plate, not shown in FIG. 9, may also be positioned at an upper edge of the first receiving array 500b, opposite the second electromagnetic shield plate 521. The fourth shield plate may also have a first direction of extension of the third shield plate parallel to the longitudinal extension of the waveguides 503b, and a second direction of extension, which second direction of extension is perpendicular to the first direction of extension and forms an obtuse angle to the front side of the second array 500b. The use of the fourth electromagnetic shield plate is optional.

By having the electromagnetic shield plates 520 and 521 between the radiating array 500a and the receiving array 500b, the amount of false reflections from the radiating antenna 500a reaching the receiving antenna 500b is further reduced, thereby improving the signal to noise ratio.

Figure 10:
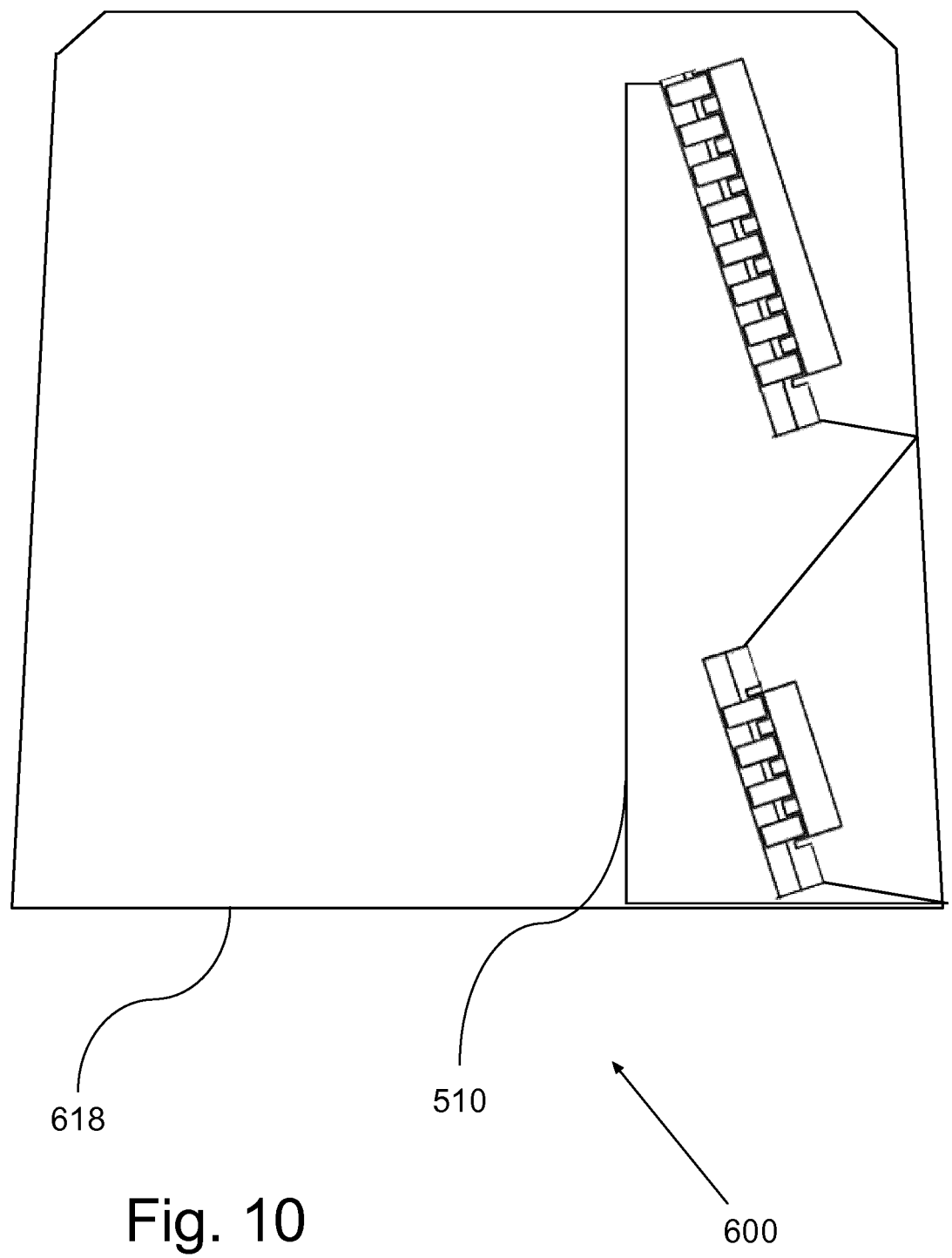
FIG. 10 is a schematic cut through view of a radar system holding a single antenna module as illustrated in FIG. 9 covered by a protective radome according to an example embodiment.

FIG. 10 is a schematic cut through view of a radar system 600 holding a single antenna module 510 as illustrated in FIG. 9 covered by a protective radome 618 according to an example embodiment. The radome 618 may be made of the same material as the radome 2118 of the antenna system 2101 of FIG. 2a. The scanning radar system 2101 of FIG. 2a holds two back-to-back positioned antenna modules 2110a and 2110b, but it is also within an embodiment to provide a detection system using a radar system having only a single antenna module 510, such as the radar system 600 of FIG. 10. When using only a single radar module 510, the rotation speed of the radar system 600 may be increased or doubled when compared to the rotation speed of the radar system 2101 having two radar modules 2110a, 2110b. When increasing the rotation speed, the exposure time on the object target is decreased, thereby decreasing the signal to noise ratio.

Figure 11:
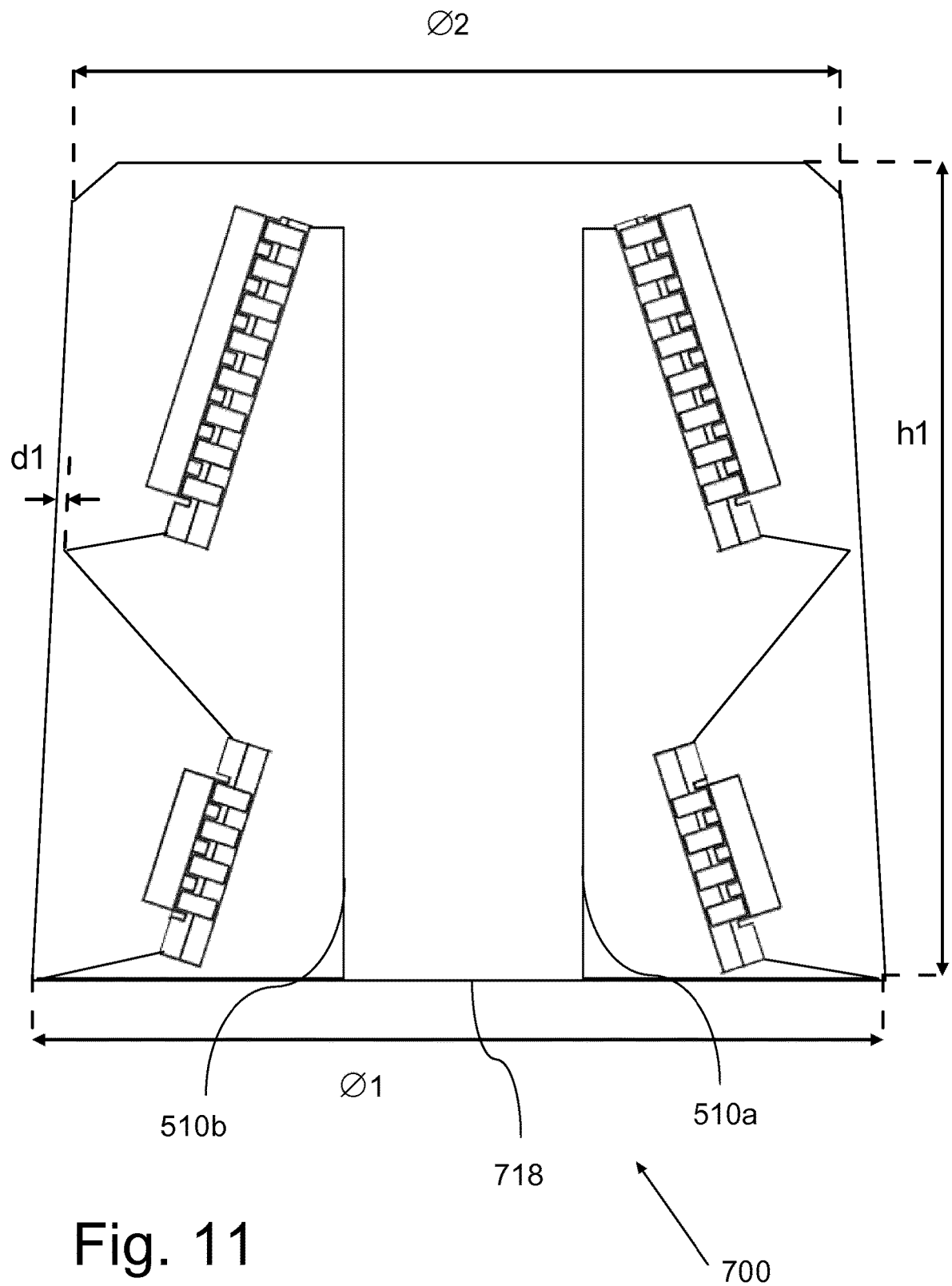
FIG. 11 is a schematic cut through view of a radar system holding two of the antenna modules illustrated in FIG. 9 with both antenna modules covered by a protective radome according to an example embodiment.

It may therefore be preferred to use a radar system with two antenna modules as illustrated with the system 2101 of FIG. 2a. FIG. 11 is a schematic cut through view of an embodiment of a radar system 700 holding two antenna modules 510a and 510b equal to the module 510 as illustrated in FIG. 9, and with both antenna modules 510a, 510b covered by a protective radome 718. The radome 710 may be made of the same material as the radome 2118 of the antenna system 2101 of FIG. 2a.

The radome 618, 718 has a cylindrically shaped wall part surrounding the antenna module(s) 510 or 510a and 510a, and the wall part may be slightly inclined towards the antenna module(s) 510 or 510a and 510a forming a small acute inclination angle to a vertical axis of rotation, where this small acute angle should be no larger than 10°, such as no larger than 5, such as about 3°. The radome 718 of FIG. 11 may in an example embodiment be dimensioned with a height h1 of 561 mm, a lower outer diameter Ø1 of 540 mm, and an upper outer diameter of Ø2 of 494 mm, resulting in a small acute angle of about 3°. In an example embodiment the first and second shield plates 520, 521 of the radar antenna module 510 or modules 510a and 510b each have a second outer edge proximate the cylindrically wall part of the radome 618 or 718, said second outer edges being curve shaped to follow the interior of the cylindrically shaped radome 618 or 718. The third shield plate 522 of a radar antenna module 510 or 510a and 510b also has a second outer edge proximate the cylindrically wall part of the radome 618 or 718, said second outer edge also being curve shaped to follow the interior of the cylindrically shaped radome. The distance d1, see FIG. 11, between the second outer edge of the shield plates 520, 521 and 522 and the interior of the cylindrically shaped wall part of the radome 618, 718 should be no larger than 15 mm, such as no larger than 10 mm, such as no larger than 8 mm. The system 700 of FIG. 11 may in an example embodiment hold a distance d1 of about 8 mm. For the system 700 of FIG. 11, the first and second antenna modules 510a and 510b are arranged in a mirrored position relative to a plane intersecting a vertical center axis of rotation, see axis 2115 of FIG. 2a.

Figure 12:
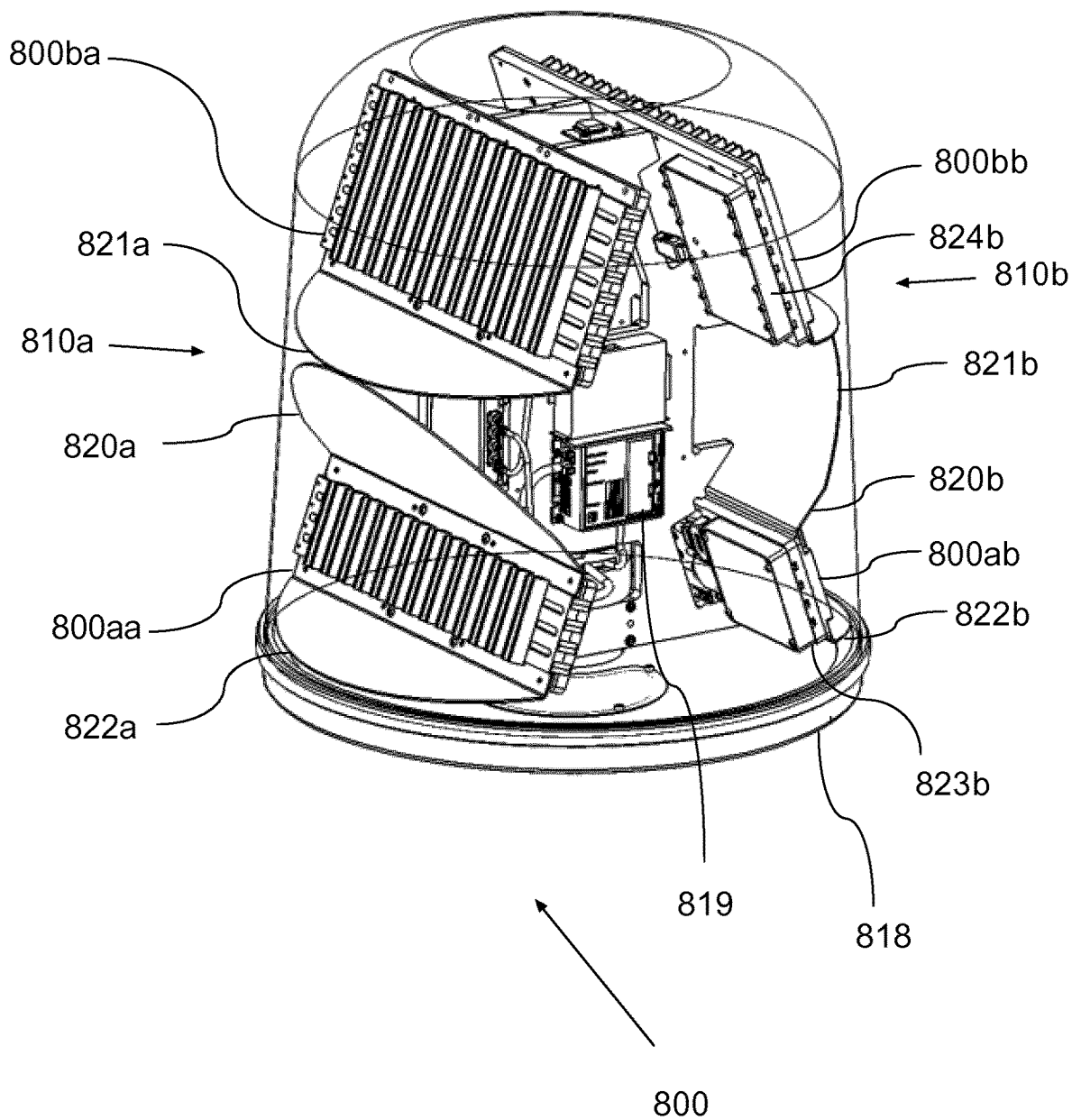
FIG. 12 is a perspective view illustrating a radar system with a back-to-back arrangement of two antenna modules of the type illustrated in FIG. 9 according to an example embodiment.

FIG. 12 is a perspective view illustrating a radar system 800 with a back-to-back arrangement of two antenna modules 810a and 810b covered by a radome 818 according to an example embodiment. Each of the modules 810a and 810b are dimensioned similar to the module 510 of FIG. 9 and arranged in a mirrored position relative to a plane intersecting a vertical center axis of rotation, see axis 2115 of FIG. 2a. Thus, the first antenna module 810a holds a first and lower radiating array 800aa with four waveguide columns, and a second higher receiving array 800ba with eight waveguide columns. Both the first and second arrays 800aa and 800ba hold plate blinds arranged perpendicular to the longitudinal direction of the waveguide columns, see FIG. 9. Similar to the first antenna module 810a, the second antenna module 810b holds a first and lower radiating array 800ab with four waveguide columns and a second higher receiving array 800bb with eight waveguide columns, and both the first and second arrays 800ab and 800bb hold plate blinds arranged perpendicular to the longitudinal direction of the waveguide columns, see FIG. 9.

For both the first and second antenna modules 810a and 810b, a first electromagnetic shield plate 820a, 820b and a second electromagnetic shield plate 821a, 821b are positioned between the first radiating array 800aa, 800ab and the second receiving array 800ba, 800bb. Both antenna modules 810a and 810b also hold a third electromagnetic shield plate 822a, 822b positioned at a lower edge of the first radiating array 800aa, 800ab.

For both antenna modules 810a, 810b the first shield plate 820a, 820b has a first outer edge in contact with an upper outermost array sidewall of the first array 800aa, 800ab, the second shield plate 821a, 821b has a first outer edge in contact with a lower outermost array sidewall of the second array 800ba, 800bb, and the third shield plate 822a, 822b has a first outer edge in contact with a lower outermost array sidewall of the first array 800aa, 800ab. FIG. 12 shows how the first, second and third shield plates 820a, 820b, 821a, 821b and 822a, 822b all have a second outer edge being curve shaped to follow the interior of the cylindrically shaped radome 818. The radome 818 may be made of the same material as the radome 2118 of the antenna system 2101 of FIG. 2a and have the same outer dimensions as the radome 718 of the system 700 illustrated in FIG. 11. The distance d1, see FIG. 11, between the second outer edge of the shield plates 820a, 820b, 821a, 821b and 822a, 822b and the interior of the cylindrically shaped wall part of the radome 618 may also be equal to the distance d1 for the system 700 of FIG. 11.

The first antenna module 810a may also hold on-board circuitry including signal processing circuitry and electronic transmit circuitry and electronic receive circuitry, not shown in FIG. 12. The second antenna module 810b also holds on-board circuitry including signal generating system, not shown in FIG. 12, and electronic transmit circuitry 823b, and electronic receive circuitry 824b. The system 800 may be supported by a rotation system, not shown in FIG. 12, and holds a motor controller 819 for controlling the rotation system.

The following describes construction details for an example embodiment of the antenna array 200 of FIGS. 3-6, and the first radiating arrays 300a, 500a and the second receiving arrays 300b, 500b of the antenna modules 310, 501 of FIGS. 7 and 9, respectively, when designed to operate in a wideband frequency range of 9550 to 9750 MHz, corresponding to a free-space wavelength $\lambda_0$ in the range of 30.77-31.4 mm, or to operate with a free-space wavelength $\lambda_0$ about 30 mm.

In order to operate in the above-mentioned frequency range, the waveguide columns 203, 303a, 503a, 303b, 503b are dimensioned with an internal height "a" of the wide inner surfaces to be about ⅔ $\lambda_0$, and set to 20 mm, and an internal width "b" of the narrow inner back and front surfaces to be about ⅓ $\lambda_0$, and set to 10 mm. The waveguide columns 203 are produced by use of milling from the first and second metal elements 201, 202 being of anodized aluminium having a plate thickness of 12 mm, and the thickness of the walls 106, 107 defining the upper parts of the wide inner surfaces of the waveguide columns 103b, 103 is about 2 mm, and the thickness of the narrow front wall is also 2 mm.

The guided wavelength, $\lambda_g$, can be calculated from the values of $\lambda_0$ and "a", where $\lambda_0$ set to 30.77 mm gives a value of $\lambda_g$, which is equal to 48 mm, and where $\lambda_0$ set to 31.4 mm gives a value of $\lambda_g$, which is equal to 50.64 mm.

From the above values of $\lambda_0$ and $\lambda_g$, the average values are found as $\lambda_{0,av}$ equal to 31 mm and $\lambda_{g,av}$ equal to 49.3 mm, which gives a value for half the free-space wavelength, ½ $\lambda_0$, to be about 15.5 mm, and a value for half the guided wavelength, ½ $\lambda_g$, to be about 24.66 mm.

The distance between the centres of neighbouring slots 208 of a waveguide column 203, 303a, 303b, 503a, 503b is set to 25 mm, equal to about half the guided wavelength, ½ $\lambda_g$, and the total length of the edge-slots 208 including the penetrations into the sidewalls 206, 207 is set to about 15 mm, equal to about half the free-space wavelength, ½ $\lambda_0$. The width of the edge-slots 208 is set to 3.6 mm, and the slots 208 are arranged with an angular displacement of about 35 degrees to the longitudinal direction to the waveguide column 203, where neighbouring slots 208 are arranged with equal, but opposite angular displacement.

For the travelling waveguide columns 203, 303a, 303b, 503a, 503b the absorbing load at the second end is arranged with a spacing of three quarters of the guided wavelength, $\lambda_g$, which is equal to 37 mm, to the centre of the last slot 208.

The signal probe 214 is inserted into the column 203 with a spacing of three quarters of a guided wavelength, $\lambda_g$, which is about 42 mm, to the centre of the first slot 208, while the short circuiting end geometry at the first end is arranged with a spacing of one quarter of the guided wavelength, $\lambda_g$, which is at least about 12.4 mm, to the centre of the coupling probe 214.

The distance between the centres of adjacent positioned waveguides columns 203, 303a, 303b, 503a, 503b is set to be 20 mm, which is about two third of the free-space wavelength $\lambda_0$. This distance leaves a free space of about 6 mm between the sidewalls of neighbouring columns 203, 303a, 303b.

The spacing between the centres of adjacent plate blinds 212, 312a, 312b, 512a, 512b is set equal to the distance between the centres of neighbouring slots 208, which is 25 mm, to be about half the guided signal wavelength, $\lambda_g$, and the distance between the first and second outer surfaces of the plate blinds 212, 312a, 312b, 5012a, 512b may be set to 9.86-12 mm, which is in between one third and half of the free-space signal wave length, $\lambda_0$. The spacing left between opposite outer surfaces of neighbouring plate blinds 212, 312a, 312b, 512a, 512b is then about 12.66-14.8 mm, which is below half the free-space signal wave length of 15.5 mm, in order to effectively reduce the cross-polarization radiation. The height of the parallel outer surfaces of the plate blinds 212, 312a, 312b, 512a, 512b above the outer front surface of the columns 203, 303a, 303b, 503a, 503b may be set to be 15.5 mm, which is substantial equal to ½ of the free-space signal wave length, to thereby further reduce the cross-polarization radiation. The U-shaped plate blinds 212, 312a, 312b, 512a, 512b are made in aluminium with a sidewall thickness of 1.8 mm. The bottom part of the U-shaped plate blinds 212, 312, 512 has a wall thickness of 1.7 mm, and holds the tail of the dovetail joint to fit with the socket of the dovetail joint formed in part of the waveguide columns 203, 303a, 303b, 503a, 503b.

The total length of the arrays 300a, 300b, 500a, 500b and the columns 303a, 303b, 503a, 503b is 414 mm, and for the module 510 of FIG. 9 the total width of the first array 500a is 105 mm while the total width of the second array 500b is 185 mm. The length of the plate blinds 312a, 512a covering the four columns 303a, 503a of the radiating array 300a, 500a is 80 mm, and the length of the plate blinds 312b, 512b covering the eight columns 303b, 503b of the receiving array 300b, 503b is 160 mm. The distance between closest side walls of neighboring plate blinds 312a, 312b, 512a, 512b is 14.5 mm, and the distance between the first and second outer surfaces of the plate blinds 312a, 312b, 512a, 512b is set to 11.5 mm.

Further measures indicating the positioning of the first radiating array 500a and the second receiving array 500b according to an embodiment of the antenna module 510 of FIG. 9 are given below with reference to FIG. 13.

Figure 13:
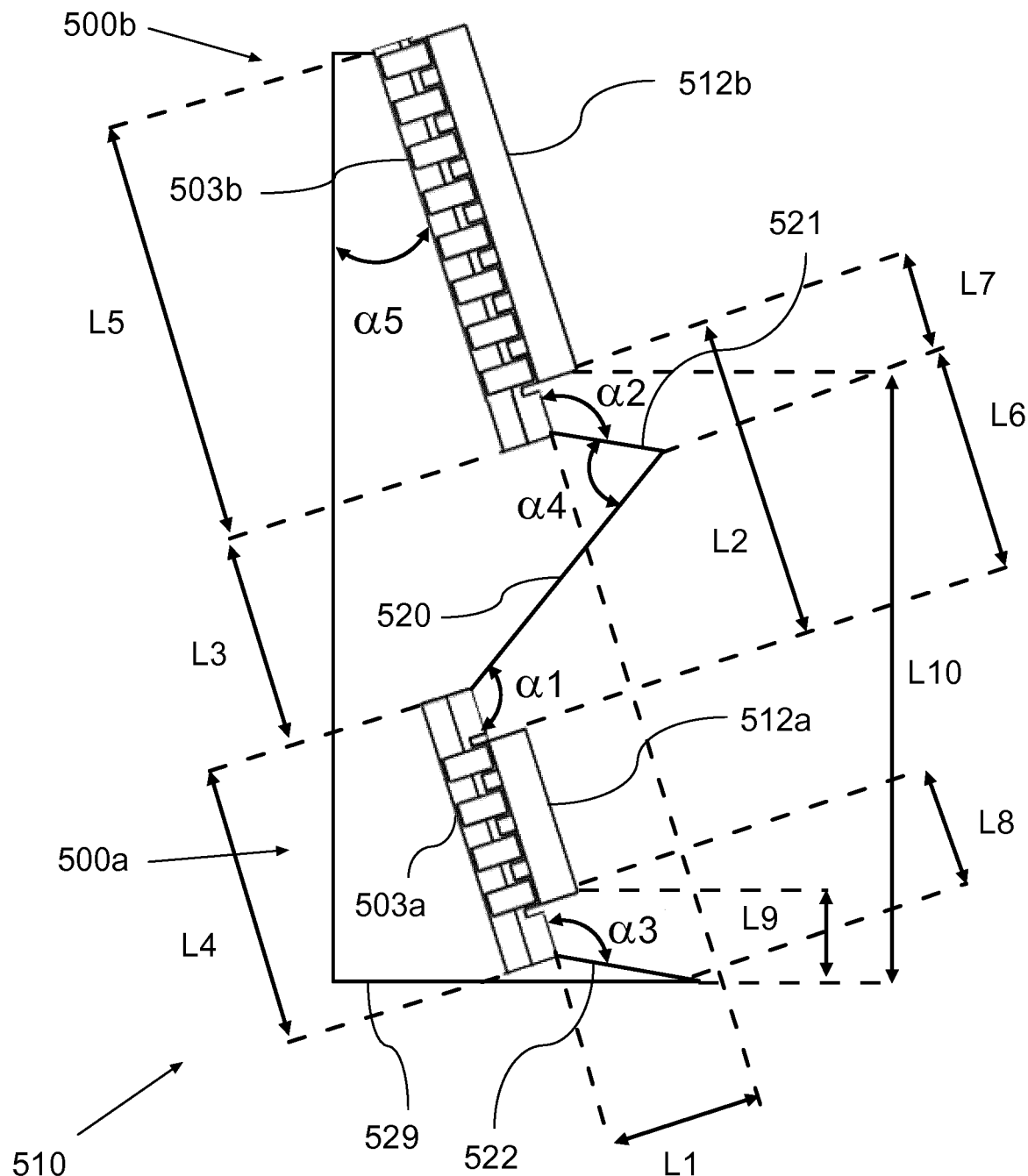
FIG. 13 shows the radar antenna module of FIG. 9 with indications of geometrical dimensions according to an example embodiment.

In FIG. 13, L1 indicates the perpendicular array distance, which is set to 75 mm, equal to 7.5 times the internal width of the waveguide columns 503a, 503b; L2 indicates the parallel column distance, which is set to 197 mm, equal to 19.7 times the internal width of the waveguide columns 503a, 503b; L3 indicates the parallel array distance, which is set to 172 mm; L4 indicates the total width of the first array 500a set to 105 mm; L5 indicates the total width of the second array 500b set to 185 mm; L6 indicates the distance from the outer sidewall of the outermost upper waveguide column of the first array 500a to the contact point between the first shield plate 520 and the second shield plates 521, which is set to 120 mm; L7 indicates the distance from the outer sidewall of the outermost lower waveguide column of the second array 500b to the contact point between the second shield plate 521 and the first shield plates 520, which is set to 77 mm; L8 indicates the distance from the outer sidewall of the outermost lower waveguide column of the first array 500a to the outermost part of the curved third shield plate 522, which is set to 71 mm; L9 indicates the distance from a lower upper edge of the plate blinds 512a of the first array 500a to the bottom of the support 529, which is set to 59 mm; L10 indicates the distance from a lower upper edge of the plate blinds 512b of the second array 500b to the bottom of the support 529, which is set to 345 mm, where the bottom of the support may be equal to a top part of a rotation system, to which the antenna module 510 may be secured.

In FIG. 13, $\alpha 1$ indicates the first obtuse angle from the second direction of extension along the front side of the first shield plate 520 to the front side of the first array 500a, which first obtuse angle is set to 120°; $\alpha 2$ indicates the second obtuse angle from the second direction of extension along the front side of the second shield plate 521 to the front side of the second array 500b, which second obtuse is set to 120°; $\alpha 3$ indicates the third obtuse angle from the second direction of extension along the front side of the third shield plate 522 to the front side of the first array 500a, which third obtuse angle is set to 120°; $\alpha 4$ indicates the first acute angle being formed between the second direction of extension of the first shield plate 520 and the second direction of extension of the second shield plate 521, which first acute angle is set to 60°.

When an antenna modules 510 is supported by a rotation system for rotating the antenna module around a vertical axis, such as the rotation system 2116 of FIG. 2a the antenna module 510 is secured to the rotation system with the first and second planar antenna arrays 500a and 500b positioned with the first and second planes holding a second acute angle $\alpha 5$ to the vertical axis of rotation, which second acute angle $\alpha 5$ may be in the range of 15° to 25°. For the embodiment illustrated in FIG. 13, the second acute angle $\alpha 5$ is set to 20°.

It is noted that for the radar system 800 of FIG. 12, each of the modules 810a and 810b may be dimensioned according to the measures given above for the module 510 of FIG. 9 and further indicated with reference to FIG. 13. Thus, both antenna modules 810a and 810b may be supported by a rotation system with the first and second planar antenna arrays 800aa, 800ab and 800ba, 800bb positioned with the first and second planes holding a second acute angle $\alpha 5$ of 20° to the vertical axis of rotation.

Figure 14A:
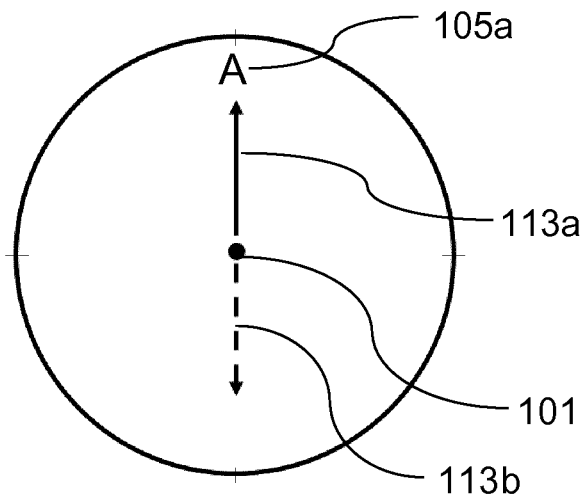
FIGS. 14a-14c illustrate scanning of a fixed object using a radar system holding two back-to-back antenna modules according to an example embodiment.
Figure 14B:
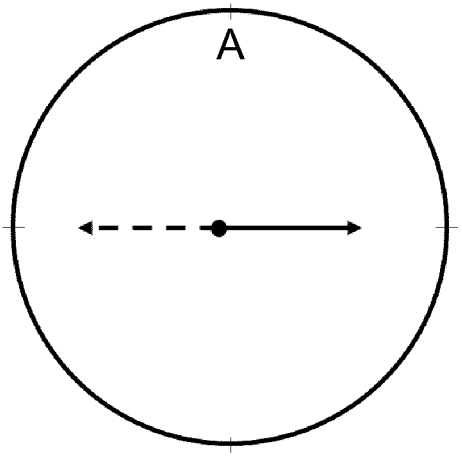
Figure 14C:
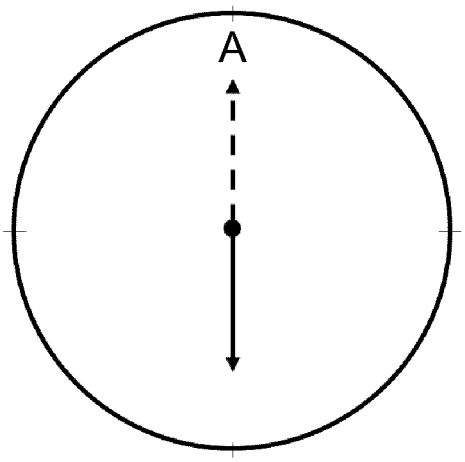

FIGS. 14a-14c illustrate scanning of a fixed object A, 105a, using a radar system holding two back-to-back antenna modules, such as the radar system 101 of FIG. 1a with antenna module 110a, 110b, according to an example embodiment. The difference in azimuth angles between the two modules 110a and 110b is 180°. In FIG. 14a, the azimuth angle is 0°, 180° and the object A is scanned by radiated waves 113a of the first antenna module 110a, while no object is scanned by the waves 113b of the second module 110b. In FIG. 14b, the azimuth angle is 90°, 270° and no object is scanned. In FIG. 14c, the azimuth angle is 180°, 0° and the object A is scanned by radiated waves 113b of the second antenna module 110b, while no object is scanned by the waves 113a of the first module 110a.

Figure 15E:
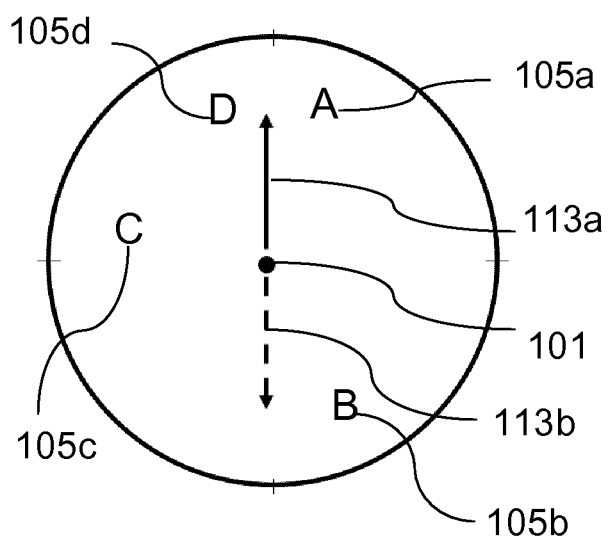
Figure 15E:
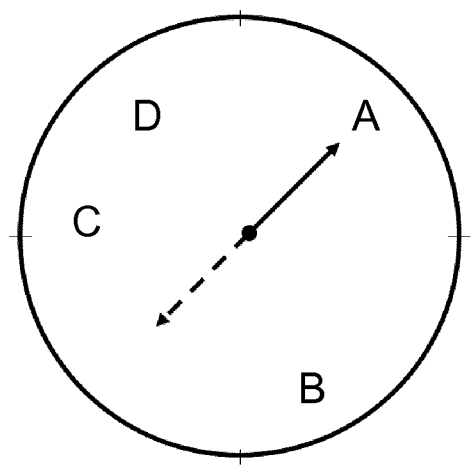
Figure 15E:
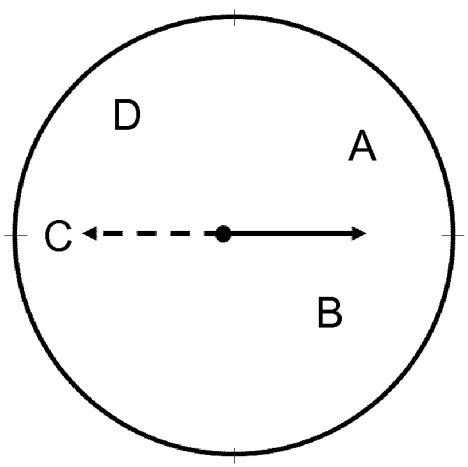
Figure 15E:
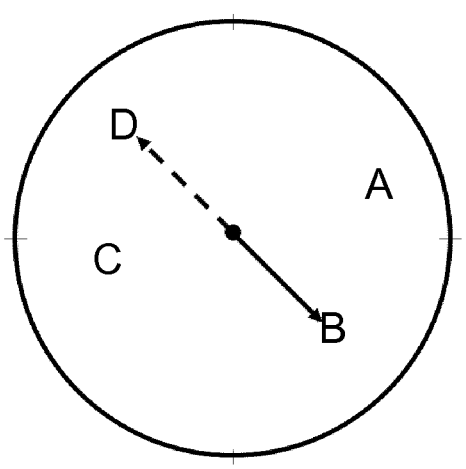
Figure 15E:
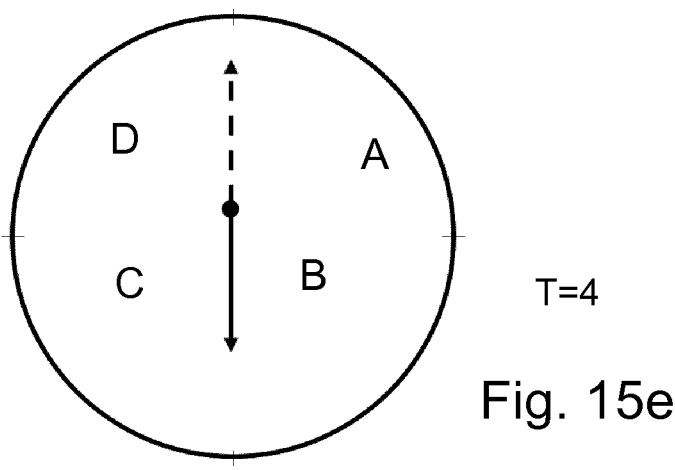

FIGS. 15a-15i illustrate scanning of four moving objects A,B,C,D, 105a,b,c,d, using a radar system, such as the system 101, holding two back-to-back antenna modules 110a, 110b according to an example embodiment. In FIG. 15a, the azimuth angle is 0°, 180° and no objects are scanned. In FIG. 15*b*, the azimuth angle is 45°, 225° and object A is scanned by radiated waves 113*a* of the first antenna module 110*a*, while no object is scanned by the waves 113*b* of the second module 110*b*. In FIG. 15*c*, the azimuth angle is 90°, 270° and object C is scanned by radiated waves 113*b* of the second antenna module 110*b*, while no object is scanned by the waves 113*a* of the first module 110*a*. In FIG. 15*d*, the azimuth angle is 135°, 305° and object B is scanned by radiated waves 113*a* of the first antenna module 110*a*, and object D is scanned by radiated waves 113*b* of the second antenna module 110*b*. In FIG. 15*e*, the azimuth angle is 180°, 0° and no objects are scanned. In FIG. 15*f*, the azimuth angle is 225°, 45° and object C is scanned by radiated waves 113*a* of the first antenna module 110*a*, while no object is scanned by the waves 113*b* of the second module 110*b*. In FIG. 15*g*, the azimuth angle is 270°, 90° and object D is scanned by radiated waves 113*a* of the first antenna module 110*a*, and object A is scanned by radiated waves 113*b* of the second antenna module 110*b*. In FIG. 15*h*, the azimuth angle is 315°, 135° and object B is scanned by radiated waves 113*b* of the second antenna module 110*b*, while no object is scanned by the waves 113*a* of the first module 110*a*. In FIG. 15*i*, the azimuth angle is 360°, 0° and object C is scanned by radiated waves 113*b* of the second antenna module 110*b*, while no object is scanned by the waves 113*a* of the first module 110*a*.

FIG. 16 is a table, Table I, giving an overview of the scanning results illustrated in FIGS. 15*a*-15*i*. Table I shows which objects are being hit or scanned with progress in time of rotation of the radar system 101, which of the antenna modules 110*a* or 110*b* hits or scans the object and at which azimuth angle. Table I also indicates a change in range of the moving objects from one scan to a following scan, where a first range is indicated by Y, a second range is Y+δ, and a third range is Y+δ2.

Figure 17:
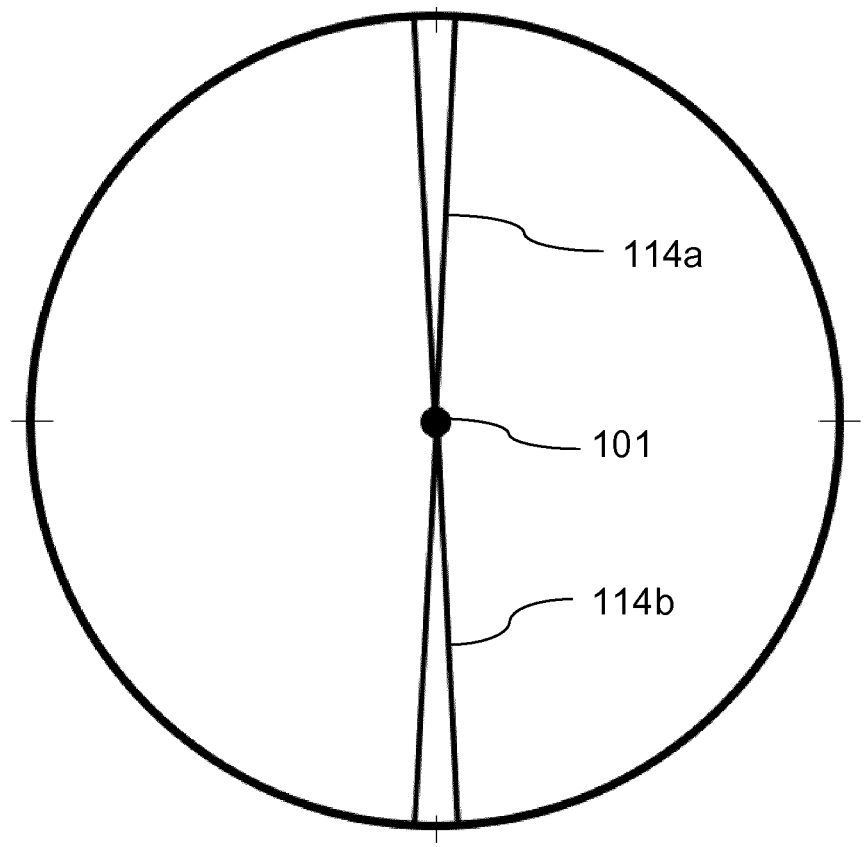
FIG. 17 illustrates simultaneous radar image capture for two opposed radar image lines using a radar system holding two back-to-back antenna modules according to an example embodiment.

FIG. 17 illustrates simultaneous radar image capture for two opposed radar image lines using a radar system, such as the system 101, holding two back-to-back antenna modules 110*a* and 110*b* according to an example embodiment. A full circular radar has 80 image lines to cover a full 360° radar image, whereby each image line covers 4.5°. By having the two back-to-back arranged antenna modules 110*a* and 110*b*, two opposite radar image lines are scanned at the same time. Thus, when the radar system 101 rotates with 30 rounds per minute, RPM, one full radar image can be obtained for half a rotation and for every second. The radar modules 110*a* and 110*b* may be configured to have an azimuth beam width of 6° in order to obtain a satisfying radar signal exposure time for each image line of 4.5°. Each image line may be divided inn 1587 range cells, and each radar antenna module 110*a* and 110*b* may be configured to transmit 100 FMCW sweeps per image line, to thereby obtain the necessary data for generating radar plots.

The present disclosure has been described in conjunction with various embodiments herein. However, other variations to the disclosed embodiments can be understood and effected by those skilled in the art in practicing the claimed present disclosure, from a study of the drawings, the disclosure, and the appended claims. In the claims, the word "comprising" does not exclude other elements or steps, and the indefinite article "a" or "an" does not exclude a plurality.

The invention claimed is:

1. A radar system comprising a first and a second antenna module, each said antenna module comprising:
   a first planar slotted waveguide antenna array configured for radiating electromagnetic waves; and
   a second planar slotted waveguide antenna array configured for receiving electromagnetic waves;
   wherein for each of the antenna modules, each planar slotted waveguide antenna array comprises several longitudinal extending waveguide columns disposed in a parallel and adjacent position with respect to one another, said waveguide columns having a front side and a rear side with a plurality of cavity slots on the front side, and said waveguide columns further having first and second column ends; and
   wherein for each of the antenna modules, the first and second antenna arrays are arranged with the longitudinal direction of the waveguide columns extending in a single, horizontal direction, and with the waveguide columns of the first antenna array disposed in a parallel position to the waveguide columns of the second antenna array;
   said radar system further comprising a rotation system configured for supporting and rotating the first and second antenna modules around a vertical axis, with the first and second antenna modules arranged in a back-to-back position on opposite sides of a plane intersecting the vertical axis of rotation, and with the rear side of the waveguide columns of the antenna arrays of the first antenna module facing the rear side of the waveguide columns of the antenna arrays of the second antenna module; wherein
   for each antenna module, the waveguide columns of the first antenna array are disposed below the waveguide columns of the second antenna array when compared to the vertical axis of rotation; and in that
   for each antenna module, an electromagnetic shield or shield plate is arranged substantially parallel to the waveguide columns and between a first lower radiating antenna array and a second upper receiving antenna array, said shield or shield plate extending outwards from the front side of the antenna module.

2. The radar system according to claim 1, wherein the cavity slots on the front side of the columns of the second antenna array of the first antenna module are arranged in a partially upwards facing plane having a first acute angle to the vertical direction, and wherein the cavity slots on the front side of the columns of the first antenna array of the second module are arranged in a partially upwards facing plane having a second acute angle to the vertical direction.

3. The radar system according to claim 2, wherein the first acute angle is substantial equal to the second acute angle, and wherein said first and second acute angles are in the range of 10-30.

4. The radar system according to claim 1, wherein the first and second antenna modules are arranged in a mirrored position relative to said plane intersecting the vertical axis of rotation.

5. The radar system according to claim 1, wherein the waveguide columns within the first and second antenna arrays of both the first and second antenna module have equal dimensions; and
   wherein for each of the antenna modules, the front side of the columns holding the cavity slots of both the first and second antenna arrays are positioned substantially in the same plane.

6. The radar system according to claim 1, said system further comprising a protective housing in the form of a radome covering said first and second antenna modules.

7. The radar system according to claim 6, wherein the radome is made of a material having a high electromagnetic transparency, such as made of a polyethylene (PE) or polypropylene (PP) based ultra high molecular weight plastic material; and wherein the radome preferably is made of a material having a thickness in the range of 1-3 mm.

8. The radar system according to claim 1, wherein for each antenna module, a lower electromagnetic shield or shield plate is arranged substantially parallel to the waveguide columns and below the lowermost waveguide column of the first lower radiating antenna array, said lower electromagnetic shield or shield plate extending outwards from the front side of the antenna module.

9. The radar system according to claim 1, wherein for each antenna module, an upper electromagnetic shield or shield plate is arranged substantially parallel to the waveguide columns and above the uppermost waveguide column of the second upper receiving antenna array, said upper electromagnetic shield or shield plate extending outwards from the front side of the antenna module.

10. The radar system according to claim 1, wherein for each antenna module, the first antenna array holds a number of parallel plate blinds secured to the front side of the first antenna array besides or between the cavity slots and substantially perpendicular to the longitudinal direction of the waveguide columns of the first antenna array; and wherein the second antenna array holds a number of parallel plate blinds secured to the front side of the second antenna array besides or between the cavity slots and substantially perpendicular to the longitudinal direction of the waveguide columns of the second antenna array.

11. The radar system according to claim 1, wherein for each of the antenna module, the number of waveguide columns in the second upper receiving antenna array is larger than the number of waveguide columns in the first lower radiating antenna array; and wherein for each antenna module, the number of waveguide columns in the second upper receiving antenna array is twice the number of waveguide columns in the first lower radiating array.

12. The radar system according to claim 1, wherein the system further comprises a signal generating system holding a single signal generator, and wherein the first antenna module holds first electronic transmit circuitry configured for feeding the first radiating array of the first antenna module to radiate first electromagnetic signals, and the second antenna module holds second electronic transmit circuitry configured for feeding the first radiating array of the second antenna module to radiate second electromagnetic signals, said first and second electromagnetic signals being fully synchronized electromagnetic signals based at least partly on signals provided by said single signal generator.

13. The radar system according to claim 12, wherein the first antenna module holds first electronic receive circuitry configured for processing signals received by the second upper receiving antenna array of the first antenna module, and the second antenna module holds second electronic receive circuitry configured for processing signals received by the second upper receiving antenna array of the second antenna module, said first and second electronic receive circuitry being configured for processing the received signals in synchronization with the radiated electromagnetic signals, said synchronization being based on signals provided by the single signal generator.

14. The radar system according to claim 1, wherein the system further comprises:
first processing circuitry for processing signals received by the first antenna module, said first processing circuitry being configured to provide first type radar plots of detected objects presented by said signals received by the first antenna module; and
second processing circuitry for processing signals received by the second antenna module, said second processing circuitry being configured to provide second type radar plots of detected objects presented by said signals received by the second antenna module.

15. The radar system according to claim 14, wherein the system further comprises:
third processing circuitry being radar track processing circuitry, said radar track processing circuitry being configured to provide a radar track for a detected object based on both first and second type radar plots.

* * * * *